US011682327B2

(12) United States Patent
Fujikawa

(10) Patent No.: US 11,682,327 B2
(45) Date of Patent: Jun. 20, 2023

(54) SUBSTRATE FOR ELECTRO-OPTICAL DEVICE, ELECTRO-OPTICAL DEVICE, AND ELECTRONIC APPARATUS, METHOD FOR MANUFACTURING ELECTRO-OPTICAL DEVICE, AND INSPECTION CIRCUIT

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/670,850

(22) Filed: Feb. 14, 2022

(65) Prior Publication Data

US 2022/0262288 A1    Aug. 18, 2022

(30) Foreign Application Priority Data

Feb. 15, 2021 (JP) .............................. JP2021-021504

(51) Int. Cl.
  *G09G 3/00* (2006.01)
  *H04N 9/31* (2006.01)
  *G02F 1/1333* (2006.01)

(52) U.S. Cl.
  CPC ....... *G09G 3/006* (2013.01); *G02F 1/133382* (2013.01); *G09G 2330/045* (2013.01); *G09G 2330/12* (2013.01); *H04N 9/3144* (2013.01); *H04N 9/3194* (2013.01)

(58) Field of Classification Search
  CPC ................ G09G 3/006; G09G 2330/12; G02F 1/133382
  See application file for complete search history.

(56) References Cited

U.S. PATENT DOCUMENTS

2016/0284446 A1\* 9/2016 Fujikawa ............... H01C 7/006
2019/0059145 A1\* 2/2019 Miyoshi ............... G09G 3/3406

FOREIGN PATENT DOCUMENTS

JP    H07-294952 A    11/1995
JP    2016-184719 A    10/2016

OTHER PUBLICATIONS

TOYO Corporation, "Considerations for Low Current Measurements in Cryogenic Probe Stations," Jul. 16, 2020, pp. 1-3.

\* cited by examiner

*Primary Examiner* — Hang Lin
(74) *Attorney, Agent, or Firm* — Oliff PLC

(57) ABSTRACT

A substrate for an electro-optical device includes a first mounting terminal and a second mounting terminal connected to a sensor element. The substrate for an electro-optical device includes a first resistive element including a first end electrically connected to the first mounting terminal and a second end electrically connected to the second mounting terminal, a second resistive element including a first end electrically connected to the first resistive element and a second end electrically connected to the second mounting terminal, and a third mounting terminal electrically connected to the second end of the first resistive element and the first end of the second resistive element.

14 Claims, 10 Drawing Sheets

SUBSTRATE FOR ELECTRO-OPTICAL DEVICE, ELECTRO-OPTICAL DEVICE, AND ELECTRONIC APPARATUS, METHOD FOR MANUFACTURING ELECTRO-OPTICAL DEVICE, AND INSPECTION CIRCUIT

The present application is based on, and claims priority from JP Application Serial Number 2021-021504, filed Feb. 15, 2021, the disclosure of which is hereby incorporated by reference herein in its entirety.

BACKGROUND

1. Technical Field

The present disclosure relates to a substrate for an electro-optical device provided with a sensor element, an electro-optical device, a method for manufacturing an electro-optical device, and an inspection circuit.

2. Related Art

In an electro-optical device such as a liquid crystal device or an organic electroluminescence display device, a sensor element may be provided on a substrate constituting an electro-optical panel included in the electro-optical device. For example, in an electro-optical device used as a light valve in a projection-type display device, the temperature of the electro-optical panel tends to increase because the illumination light is radiated to the electro-optical panel with high intensity. In such a case, the modulation characteristics and the response characteristics of the liquid crystal layer change. Thus, a technology has been proposed in which a diode element is provided as a sensor element for temperature detection on a substrate used for an electro-optical panel, while a constant-current circuit is provided on a circuit board electrically connected to mounting terminals of the substrate and in which control of a cooling fan or the like is performed based on the voltage of the sensor element obtained when the constant-current circuit applies a constant current to the sensor element (see JP-A-2016-184719).

On the other hand, in a manufacturing process for the electro-optical device, a plurality of substrates constituting the electro-optical panel are provided on a large substrate referred to as a mother substrate. In a final stage including a subscribe process, the mother substrate is divided into the individual substrates. A configuration has been proposed in which in order to protect, in the above-described case, circuit elements formed on the substrate from static electricity, and to eliminate charge and the cause of ghosting or the like from the electro-optical panel into which the substrates are formed, the mounting terminals are electrically connected by a resistive element (see JP-A-7-294952).

When the temperature detection circuit described in Japanese Unexamined Patent Application Publication No. 2016-184719 is provided on the large substrate described in JP-A-7-294952, an anode terminal and a cathode terminal of a diode element constituting the temperature detection circuit are electrically connected via the resistive element. Accordingly, when current is passed from the anode terminal to test the electrical characteristics of the diode element, a current path to the diode element and a current path through the resistive element are present. Accordingly, there is a problem in that the electrical characteristics of the diode element provided on the substrate for an electro-optical device including a large substrate or substrates into which the large substrate is divided therein fail to be properly achieve. Such a problem similarly occurs when sensor elements other than diode elements for temperature detection are provided as sensor elements.

SUMMARY

In order to solve the above-described problems, a substrate for an electro-optical device according to the present disclosure includes a sensor element, a first terminal electrically connected to one electrode of the sensor element, and a second terminal electrically connected to the other electrode of the sensor element, a first resistive element electrically connected between the first terminal and the second terminal, a second resistive element electrically connected between the first resistive element and the second terminal, and a third terminal electrically connected between the first resistive element and the second resistive element.

The substrate for an electro-optical device according to the present disclosure includes a first region including a pixel area in which pixel electrodes may be arranged and amounting terminal electrically connected to the pixel area, a second region adjacent to the first region, and the sensor element, the first terminal, the second terminal, the third terminal, the first resistive element, and the second resistive element may be provided in the first region. In such a substrate for an electro-optical device, a small substrate obtained by division and corresponding to the first region is used for an electro-optical device. In this case, the electro-optical device includes a circuit board electrically connected to the small substrate, and a sensor drive circuit provided at the circuit board, and the sensor drive circuit includes a power distribution circuit configured to pass current through the first terminal, a voltage setting unit configured to apply, to the third terminal, a voltage corresponding to a voltage at the first terminal, and a detection circuit configured to detect a voltage or current of the first terminal.

The substrate for an electro-optical device according to the present disclosure may include a first region including a pixel area in which pixel electrodes are arranged, and mounting terminals electrically connected to the pixel area, and a second region adjacent to the first region, at least the sensor element, the first terminal, and the second terminal may be provided in the first region, and at least one of the first resistive element and the second resistive element may be provided in the second region. In the substrate for an electro-optical device, a small substrate obtained by division and corresponding to the first region is used for an electro-optical device. In this case, the electro-optical device includes a circuit board electrically connected to the substrate for an electro-optical device, and a sensor drive circuit provided at the circuit board, and the sensor drive circuit includes a power distribution circuit configured to pass current through the first terminal, and a detection circuit configured to detect a voltage or current of the first terminal.

The electro-optical device according to the present disclosure is used for an electronic apparatus, and in such an electronic apparatus, drive conditions, cooling conditions, or heating conditions of the electro-optical device are adjusted based on detection results from the sensor element.

In the present disclosure, an inspection circuit for inspecting a sensor element in a form of a substrate for an electro-optical device includes a power distribution circuit configured to pass current through the first terminal, a voltage setting unit configured to apply, to the third terminal, a voltage corresponding to a voltage at the first terminal, and a detection circuit configured to detect a voltage or current of the first terminal.

DESCRIPTION OF EXEMPLARY EMBODIMENTS

Figure 1:
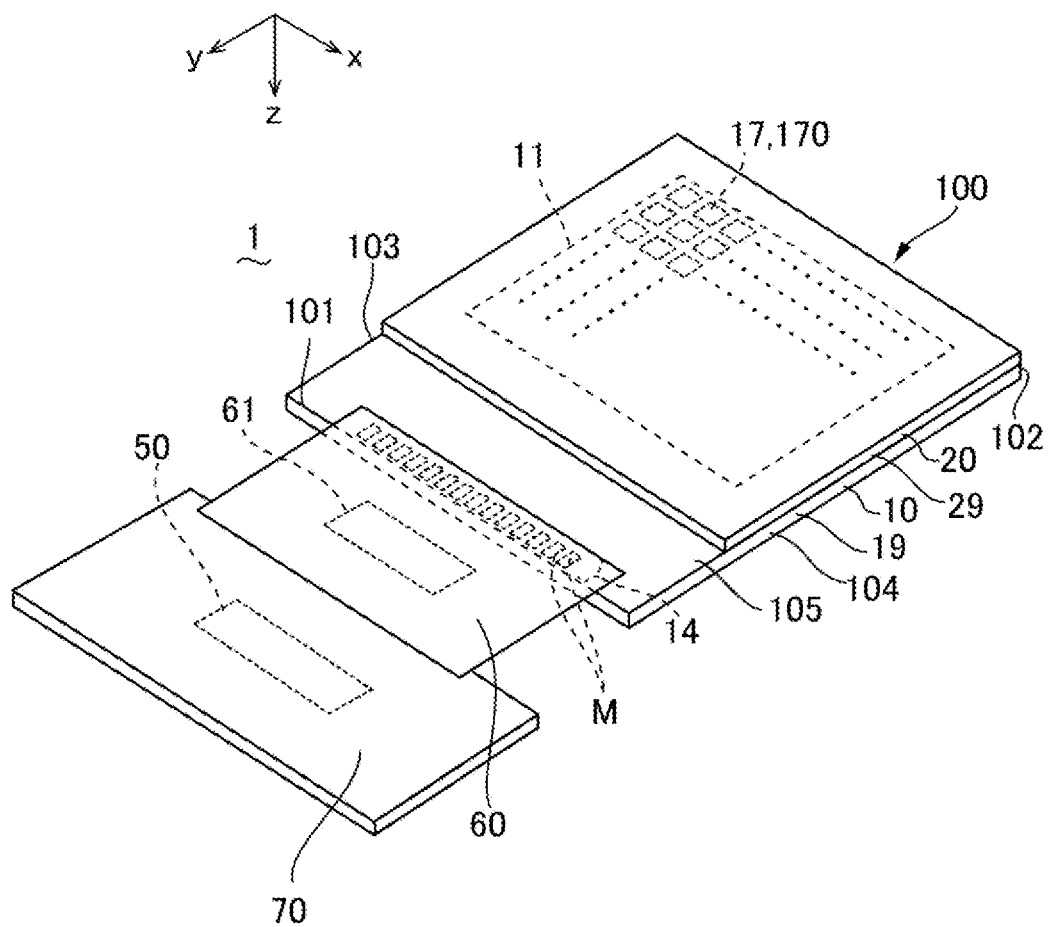
FIG. 1 is an explanatory diagram illustrating an electro-optical device to which the present disclosure is applied.

Exemplary embodiments of the disclosure will be described below with reference to the drawings. Note that, in the drawings to be referenced in the descriptions below, to make members and the like recognizable in terms of size in the drawings, the members and the like are illustrated in different scales, and a number of terminals and other like components is reduced.

In an electro-optical panel 100 described below, a sensor element 160 is provided on a first substrate 10 provided with pixel electrodes 170. The sensor element 160 is inspected during a manufacturing process in the form of a large substrate 90 as a mother substrate on which a plurality of the first substrates 10 are disposed.

In this regard, the large substrate 90 includes a plurality of first regions 91 separated into first substrates 10, and second regions 92 corresponding to scribe regions scribed when the large substrate 90 is divided into a plurality of the first substrates 10 as individual small substrates 95, and a first resistive element R1, a second resistive element R2, and the like used to inspect the sensor element 160 may all be disposed in the first region 91. The form in such a case will be described as a first embodiment.

In addition, in the large substrate 90, at least one of the first resistive element R1 and the second resistive element R2 used to inspect the sensor element 160 may be formed in the second region 92 adjacent to the first region 91. The form in such a case will be described as a second embodiment.

First Embodiment 1-1. Basic Configuration of Electro-Optical Device 1

FIG. 1 is an explanatory diagram illustrating an aspect of an electro-optical device 1 to which the present disclosure is applied. In FIG. 1, each direction is represented using an orthogonal coordinate system including an x-axis, a y-axis, and a z-axis. The z-axis direction is the thickness direction of the electro-optical panel 100, the y-axis direction is the extension direction of a circuit board 60 connected to the electro-optical panel 100, and the x-axis direction is a width direction orthogonal to the extension direction of the circuit board 60.

In FIG. 1, the electro-optical device 1 is a liquid crystal device, and includes a liquid crystal panel as an electro-optical panel 100. The electro-optical panel 100 includes a plurality of pixel electrodes 170 formed on the first substrate 10, a common electrode (not illustrated) formed on the second substrate 20, and an electro-optical layer (not illustrated) provided between the pixel electrode 170 and the common electrode and formed from a liquid crystal layer. In the present embodiment, the first substrate 10 includes two sides 101, 102 extending in the x-axis direction and two sides 103, 104 extending in the y-axis direction. The pixel electrode 170 constitutes a pixel 17 by facing the common electrode via the electro-optical layer, and a pixel area 11 is an area in which the pixels 17 are arranged in the x-axis direction and in the y-axis direction. The first substrate 10 and the second substrate 20 are laminated together by a sealing material (not illustrated) in a frame shape, and an electro-optical layer is provided in a region surrounded by the sealing material. The pixel 17 is provided with a pixel switching element (not illustrated) electrically connected to the pixel electrode 170. Additionally, the pixel 17 is provided with an auxiliary capacitance (not illustrated) with one electrode electrically connected to the pixel electrode 170, and a common voltage is applied to the other electrode of the auxiliary capacitance.

The electro-optical panel 100 in the present embodiment is a transmissive liquid crystal panel. Accordingly, a substrate main body 19 of the first substrate 10 and a substrate main body 29 of the second substrate 20 are formed from a light-transmitting substrate such as heat-resistant glass or a quartz substrate, and the pixel electrode 170 and the common electrode are formed from a conductive film such as light-transmitting indium tin oxide (ITO). In the transmissive electro-optical panel 100, for example, illumination light incident from one of the first substrate 10 and the second substrate 20 is modulated while exiting from the other substrate side, and exits as display light. In the present embodiment, illumination light incident from the second substrate 20 is modulated while exiting the first substrate 10, and exits as display light.

The first substrate 10 includes a protruding portion 105 protruding from an end portion of the second substrate 20 in the y-axis direction. The protruding portion 105 is provided with a mounting terminal region 14 in which a plurality of mounting terminals M are arranged at a predetermined pitch along the first side 101. The electro-optical device 1 includes a flexible first circuit board 60 connected to the mounting terminals M, and the first circuit board 60 extends in the y axis direction and is spaced apart from the first substrate 10. Additionally, a second circuit board 70 is connected to the first circuit board 60 opposite to the electro-optical panel 100. The first circuit board 60 is provided with a drive IC 61, which outputs, to the electro-optical panel 100, a signal or the like generated based on a signal received via the second circuit board 70. The second circuit board 70 is provided with a sensor drive circuit 50 that drives a sensor circuit 16 described below with reference to FIGS. 2 and 3.

1-2. Configuration of First Substrate 10

Figure 2:
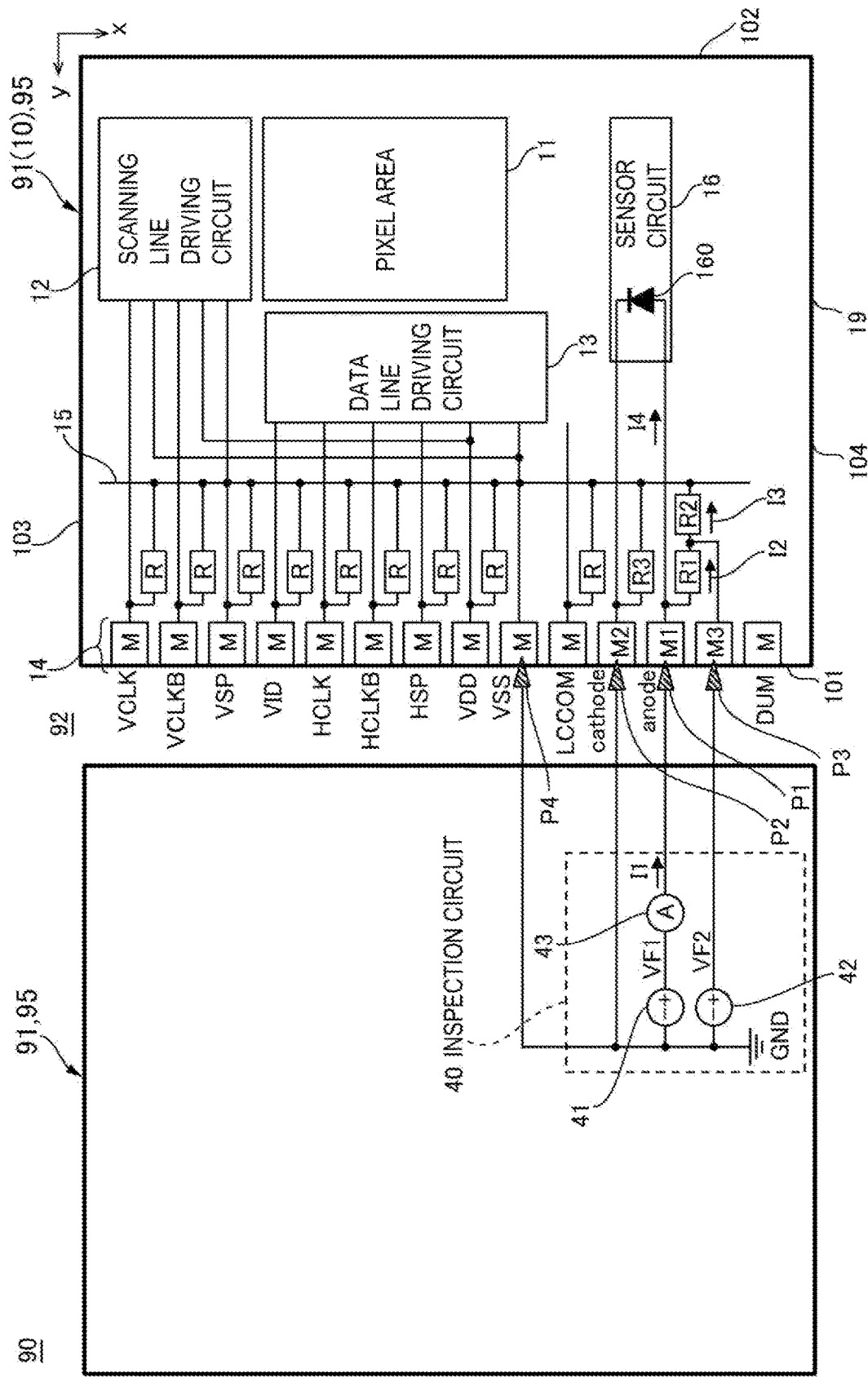
FIG. 2 is an explanatory diagram of a large substrate for manufacturing an electro-optical device according to a first embodiment of the present disclosure.

FIG. 2 is an explanatory diagram of the large substrate for manufacturing the electro-optical device 1 according to the first embodiment of the present disclosure. FIG. 2 illustrates inspection of the sensor element 160 in the form of the large substrate 90 for manufacturing the first substrate 10. In the present embodiment, the large substrate 90 corresponds to the "substrate for an electro-optical device" according to the present disclosure.

As illustrated in FIG. 2, the large substrate 90 includes a plurality of first regions 91 in which the first substrate 10 is disposed. The large substrate 90 includes a second region 92 located between the first regions 91 adjacent to each other and scribed when the large substrate 90 is divided into small substrates 95 as the first substrates 10, and the first region 91 and the second region 92 are adjacent to each other. The first substrate 10 includes a scanning line drive circuit 12 provided at a position adjacent to the pixel area 11 in the x-axis direction, and a data line drive circuit 13 provided between the pixel area 11 and the mounting terminal region 14 in which the plurality of mounting terminals M are arranged. The scanning line drive circuit 12 supplies a scanning signal to a pixel switching element of each pixel via a scanning line (not illustrated). The data line drive circuit 13 supplies an image signal to the pixel electrode 170 via a data line (not illustrated) and a pixel switching element. Accordingly, the mounting terminal region 14 includes the mounting terminals M directly and electrically connected to the pixel area 11. Additionally, the mounting terminal region 14 includes the mounting terminals M electrically connected to the pixel area 11 via the scanning line drive circuit 12 or the data line drive circuit 13.

The plurality of mounting terminals M and wires extending from the plurality of mounting terminals M respectively correspond to the following signals and voltages. Note that the illustrated signals and power supplies are representative examples and that in practice, the image signal is received from a large number of terminals, an output control signal not illustrated shapes the waveform of the scanning signal output by the scanning line drive circuit 12, and the data line drive circuit 13 shapes supply timing signals for the supply of the image signal to the data line.

Clock signal VCLK for the scanning line drive circuit
Inverted clock signal VCLKB for the clock signal VCLK
Start pulse VSP for the scanning line drive circuit
Image signal VID
Clock signal HCLK for the data line drive circuit
Inverted clock signal HCLKB for the clock signal HCLK
Start pulse HSP for the data line drive circuit
High voltage VDD
Low voltage VSS
Common voltage LCCOM In the present embodiment, a short circuit line 15 extending in the x-axis direction is provided between the mounting terminal region 14 and the data line drive circuit 13. The short circuit line 15 is electrically connected to the mounting terminal M corresponding to the low voltage VSS. Of the plurality of mounting terminals M corresponding to the above-described signals and voltages, the plurality of mounting terminals M other than the mounting terminal M corresponding to the low voltage VSS are each electrically connected to the short circuit line 15 via the resistive element R. The resistance value of the resistive element R is, for example, 1 MΩ. Note that a dummy DUM mounting terminal M is also provided in the mounting terminal region 14. No wire is provided for the dummy DUM mounting terminal M, and the dummy DUM mounting terminal M is not electrically connected to the short circuit line 15.

The first substrate 10 is provided with the sensor circuit 16 located outside the pixel area 11 and including the sensor element 160. In the present embodiment, the sensor element 160 is a temperature sensor element including a diode element. Although one diode element is illustrated in FIG. 2, a plurality of diode elements are preferably electrically connected in series in order to increase sensitivity to temperature. For example, five diode elements are electrically connected in series. Such diode elements are formed using a process of forming switching elements and the like in the pixel area 11, the scanning line drive circuit 12, and the data line drive circuit 13.

In the sensor circuit 16, when the diode element is driven with a constant current, the forward voltage of the diode element is negatively correlated to temperature and exhibits good linearity from room temperature to 80° C. For example, when five diode elements are electrically connected in series, for example, driving at a constant current of, for example, 0.7 µA, leads to a temperature sensing sensitivity of approximately −10 mV/° C. Accordingly, a change in forward voltage can be sufficiently detected using a general-purpose A/D converter, allowing the temperature of the electro-optical panel 100 to be sensitively detected.

In the first substrate 10, the mounting terminal region 14 is provided with a first mounting terminal M1 electrically connected to one electrode of the sensor element 160, and a second mounting terminal M2 electrically connected to the other electrode of the sensor element 160, and the first circuit board 60 illustrated in FIG. 1 is also electrically connected to the first mounting terminal M1 and the second mounting terminal M2. In the present embodiment, the sensor element 160 is a diode element, one electrode of the sensor element 160 corresponds to an anode of the diode element, and the other electrode of the sensor element 160 corresponds to a cathode of the diode element. Accordingly, the first mounting terminal M1 is electrically connected to the anode of the diode element, and the second mounting terminal M2 is electrically connected to the cathode of the diode element.

In this regard, the first substrate 10 includes, outside the pixel area 11, the first resistive element R1 electrically connected between the first mounting terminal M1 and the second mounting terminal M2, the second resistive element R2 electrically connected between the first resistive element R1 and the second mounting terminal M2, and a third mounting terminal M3 electrically connected between the first resistive element R1 and the second resistive element R2.

One end of the first resistive element R1 is electrically connected to the first mounting terminal M1, and the other end is electrically connected to one end of the second resistive element R2. The other end of the second resistive element R2 opposite to the one end of the second resistive element R2 electrically connected to the first resistive element R1 is electrically connected to the short circuit line 15. Accordingly, the first resistive element R1 and the second resistive element R2 are electrically connected in series between the first mounting terminal M1 and the short circuit line 15, and the second resistive element R2 is electrically connected to the second mounting terminal M2 via the short circuit line 15. In this regard, in the first substrate 10, the second mounting terminal M2, the first mounting terminal M1, and the third mounting terminal M3 are arranged in this order in the mounting terminal region 14.

As described above, the first substrate 10 according to the present embodiment is provided with the first mounting terminal M1, the second mounting terminal M2, and the third mounting terminal M3, and these mounting terminals correspond to a "first terminal", a "second terminal", and a "third terminal" in the present disclosure.

First terminal=first mounting terminal M1
Second terminal=second mounting terminal M2
Third terminal=third mounting terminal M3

Additionally, the first substrate 10 is provided with the third resistive element R3 electrically connected at one end to the second mounting terminal M2 and at the other end to the short circuit line 15. Accordingly, the second resistive element R2 is electrically connected to the second mounting terminal M2 via the short circuit line 15 and the third resistive element R3. The third resistive element R3 has a resistance value of 1 MΩ similarly to the resistive element R. The first resistive element R1 and the second resistive element R2 have a resistance value of 1 MΩ similarly to the resistive element R.

According to such a configuration, after all of the components such as the pixel area 11, the mounting terminals M, and the like illustrated in FIG. 2 are formed on the large substrate 90, electrostatic charge can be absorbed by a large capacitor including the short circuit line 15 even when static electricity enters the mounting terminal M when the large substrate 90 is divided into the first substrates 10 as the small substrates 95. Accordingly, circuit elements such as switching elements provided in the pixel area 11, the scanning line drive circuit 12, the data line drive circuit 13, and the like can be protected from static electricity.

Similarly, even when static electricity enters the first mounting terminal M1 and the second mounting terminal M2, static electricity can be absorbed using the first resistive element R1, the second resistive element R2, the third resistive element R3, and the short circuit line 15. Also, even when static electricity enters the third mounting terminal M3, the second resistive element R2 can be utilized to absorb static electricity into a large capacitor including the short circuit line 15. Accordingly, the sensor element 160 provided in the sensor circuit 16 can be protected from static electricity.

As will be described in greater detail below, suppression of a current I2 is desired, the current I2 flowing through the first resistive element R1 when the sensor element 160 including a diode element is driven with a constant current. Also, static electricity that has entered the third mounting terminal M3 is desired to efficiently escape to the short circuit line 15 via the second resistive element R2. Accordingly, the resistance value may be such that the first resistive element R1>the second resistive element R2. Note that the first resistive element R1, the second resistive element R2, and the third resistive element R3 can be formed with high area efficiency by utilizing a semiconductor film used to form a circuit element on the first substrate 10, or a gate electrode film because these films have a large sheet resistance value.

1-3. Inspection of Sensor Element 160 in Form of Large Substrate 90

As illustrated in FIG. 2, when the sensor element 160 of the first substrate 10 is inspected in the form of the large substrate 90, an inspection circuit 40 separate from the first substrate 10 is used. The inspection circuit 40 includes a first probe P1, a second probe P2, and a third probe P3. By respectively bringing the first probe P1, the second probe P2, and the third probe P3 into contact with the first mounting terminal M1, the second mounting terminal M2, and the third mounting terminal M3, the sensor elements 160 of the first substrate 10 are electrically measured.

In this regard, the inspection circuit 40 includes a power distribution circuit 41 that passes current through the first mounting terminal M1 with the voltage of the second mounting terminal M2 fixed, a voltage setting unit 42 that sets the voltage VF2 of the third mounting terminal M3 to a value corresponding to the voltage VF1 of the first mounting terminal M1, and a detection circuit 43 that detects the voltage or current of the first mounting terminal M1. For example, the voltage setting unit 42 sets the voltage VF2 of the third mounting terminal M3 to a voltage having a constant difference from the voltage VF1 of the first mounting terminal M1. In the present embodiment, the voltage setting unit 42 sets the voltage VF2 of the third mounting terminal M3 to the same value as that of the voltage VF1 of the first mounting terminal M1. Such a configuration can be achieved by setting, to the voltage VF2, the output voltage of a voltage follower to which the voltage VF1 is input. Additionally, the power distribution circuit 41 and the voltage setting unit 42 may each be a separate power supply, and such a configuration can be realized by a general semiconductor analysis device.

In the present embodiment, the first probe P1 is electrically connected to the power distribution circuit 41 via the detection circuit 43. The power distribution circuit includes a voltage output circuit. The detection circuit 43 includes an ammeter disposed between the power distribution circuit 41 and the first probe P1. The second probe P2 is set to a ground voltage GND. The third probe P3 is electrically connected to the voltage setting unit 42. Accordingly, when the sensor element 160 is inspected, the power distribution circuit 41 sets the voltage of the cathode of the sensor element 160 to the ground voltage GND via the second probe P2 and the second mounting terminal M2, while the voltage VF1 is applied to the anode of the sensor element 160 via the first mounting terminal M1, and the detection circuit 43 detects the current I1 flowing through the first mounting terminal M1. At this time, the voltage setting unit 42 maintains the following condition for the voltage VF2 of the third mounting terminal M3 via the third probe P3.

VF1=VF2

Thus, the voltage VF2 (=VF1) is applied to the coupling node between the first resistive element R1 and the second resistive element R2. Consequently, the same voltage is provided to both ends of the first resistive element R1, and thus the current I2 flowing through the first resistive element R1 is zero. Thus, the current I1 flowing from the first mounting terminal M1 becomes a current I4 flowing directly to the sensor element 160. Thus, even when the first mounting terminal M1 and the second mounting terminal M2 are electrically connected via the short circuit line 15, the electrical characteristics of the sensor element 160 can be accurately measured by the voltage VF1 and the current I1 at the first mounting terminal M1.

In this regard, when the voltage VF2 is generated from the voltage follower to which the voltage VF1 is input, the voltage VF2 may be offset by a few mV, for example, 5 mV, due to the offset voltage of the operational amplifier. In this case, the current I2=5 m V/1 MΩ=5 nA flows through the first resistive element R1. The quality determination of the diode element is suitably made using an operating point current. Consequently, when the operating point current is, for example, 0.7 μA, the effect to which the current I2 is subjected is 1% or less. An increased resistance value of the first resistive element R1 facilitates elimination of the effect of the offset voltage and the like, and is thus preferable for measurement of the current I1.

The first resistive element R1 and the second resistive element R2 are formed utilizing, for example, a semiconductor film or the like that constitutes the switching elements of the liquid crystal panel. The sheet resistance changes due to variation in an impurity injection step and variation in an annealing step. In this case as well, only minute voltages are generated at both ends of the first resistive element R1, and thus the variation in the current I2 is very small compared to the operating point current. Of course, the current I2 can be substantially zeroed by sufficiently adjusting the inspection device such that the voltages VF1 and VF2 are brought closer to VF1=VF2.

In addition, a current I3 flowing toward the second mounting terminal M2 via the short circuit line 15 and the third resistive element R3 flows through the second resistive element R2. For example, when VF1=VF2=3 V at room temperature, I3=3 V/2 MΩ=1.5 µA. Such a micro-current can be sufficiently supplied from the operational amplifier constituting the voltage follower, thus posing no significant problem. Additionally, the coupling wiring from the third mounting terminal M3 to a coupling node between the first resistive element R1 and the second resistive element R2 is formed with a resistance value sufficiently smaller than that of the first resistive element R1. For example, when the coupling wiring is formed with a resistance value of 1 kΩ, the voltage of the coupling node is as expressed by the equation below, and thus the current I2 is substantially negligible. The coupling wiring can be formed using a wiring layer primarily made of aluminum that constitutes a gate electrode film used to form a circuit element on the first substrate 10, a source electrode, a drain electrode, or wiring through which a common voltage or the like is supplied. Alternatively, a light shielding layer may be used that is formed using tungsten silicide that reduces light incident on the switching elements of the pixel 17, or a light-transmitting conductive film such as ITO may be used.

$$(1 M\Omega/(1 M\Omega+1 k\Omega))\times VF1=0.999\times VF1$$

Note that the voltage follower that outputs the voltage VF2 is subject to a large capacity load (node of the short circuit line 15) via the second resistive element R2. Accordingly, a fourth probe P4 may also be brought into contact with the mounting terminal M corresponding to the low voltage VSS and electrically connected to the short circuit line 15, and the ground voltage GND is also applied to the short circuit line 15.

Additionally, in the present embodiment, the electro-optical panel uses a phase expansion driving method. Thus, the number of mounting terminals M is small, and thus the mounting terminals M have a relatively large terminal width. Accordingly, during inspection, the first probe P1, the second probe P2, the third probe P3, and the fourth probe P4 can be brought into direct contact with the mounting terminals to provide the desired signals and voltages.

Note that when the inspection circuit 40 and the first substrate 10 are electrically connected, a connector may be provided on a substrate on which the inspection circuit 40 is provided, and the electro-optical panel 100 provided with the first circuit board 60 may be mounted to the connector.

1-4. Temperature Detection during Driving of Electro-optical Device 1

Figure 3:
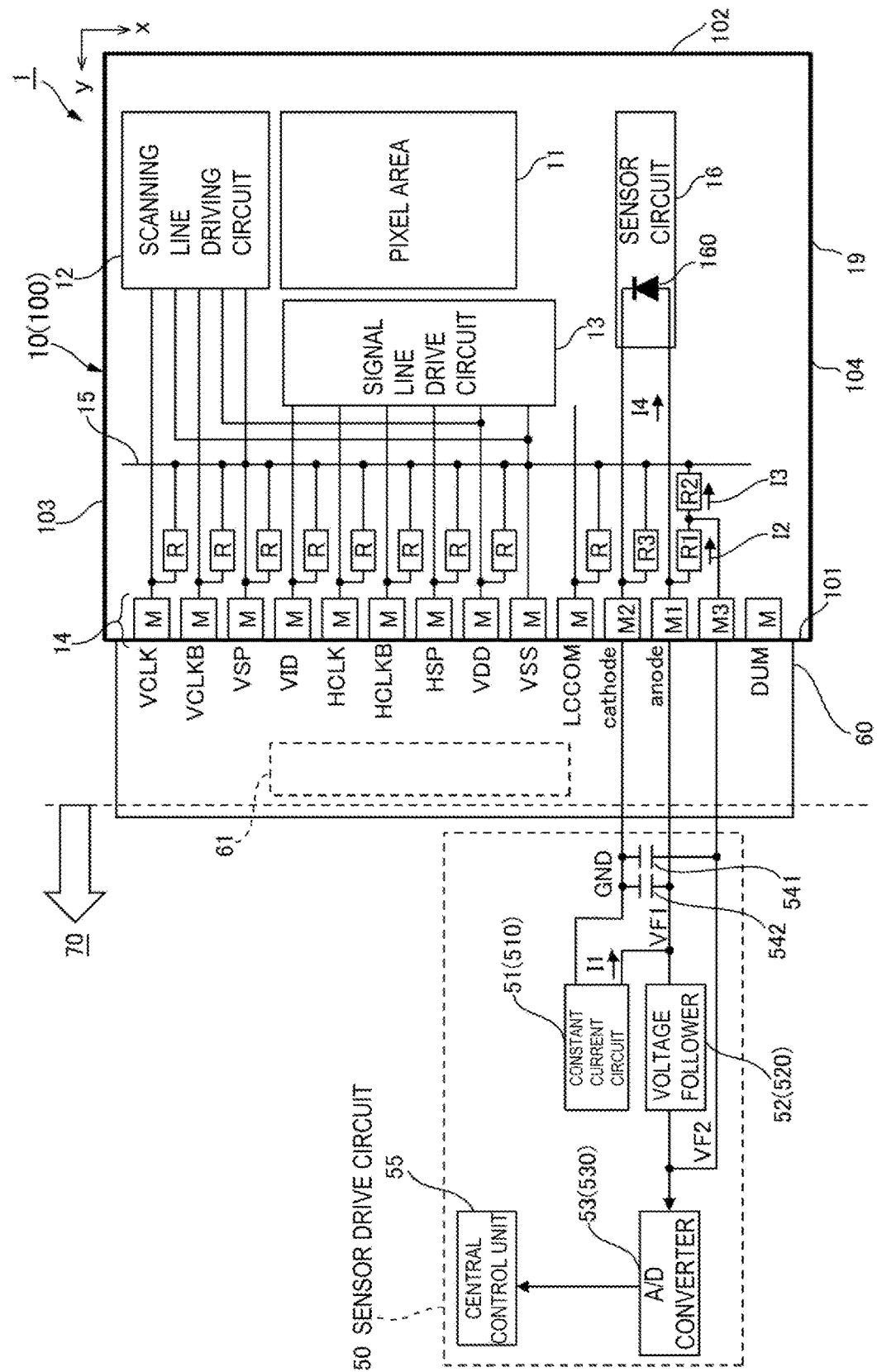
FIG. 3 is an explanatory view illustrating how the temperature of an electro-optical panel device illustrated in FIG. 1 is detected.

FIG. 3 is an explanatory diagram illustrating how the temperature of the electro-optical panel 100 illustrated in FIG. 1 is detected. FIG. 3 illustrates how the temperature of the electro-optical panel 100 is detected in the form of the electro-optical device 1. In the inspection process described with reference to FIG. 2, the first substrate 10 with the sensor element 160 inspected in the form of the unitary substrate is used for the electro-optical panel 100 of the electro-optical device 1 illustrated in FIG. 1. In this regard, as illustrated in FIG. 3, in the electro-optical device 1, the sensor drive circuit 50 that drives the sensor circuit 16 is provided on the second circuit board 70, and the sensor drive circuit 50 drives the sensor circuit 16 utilizing the first terminal including the first mounting terminal M1, the second terminal including the second mounting terminal M2, and the third terminal including the third mounting terminal M3.

However, even with the electro-optical device 1 configured, on the first substrate 10, the first mounting terminal M1 is electrically connected to the short circuit line 15 via the first resistive element R1 and the second resistive element R2, and the second mounting terminal M2 is electrically connected to the short circuit line 15 via the third resistive element R3. In this case as well, in the first substrate 10, the third mounting terminal M3 is present that electrically connects to the coupling node between the first resistive element R1 and the second resistive element R2.

Accordingly, in the present embodiment, the sensor drive circuit 50 is substantially similar to the inspection circuit 40 illustrated in FIG. 1, and includes a power distribution circuit 51 that passes current through the first mounting terminal M1 with the voltage of the second mounting terminal M2 fixed, a voltage setting unit 52 that sets the voltage VF2 of the third mounting terminal M3 to a value corresponding to the voltage VF1 of the first mounting terminal M1, and a detection circuit 53 that detects the voltage VF1 or the current of the first mounting terminal M1.

In the present embodiment, the power distribution circuit 51 is a constant current circuit 510 that supplies a constant current (current I1) to the sensor element 160 via the first mounting terminal M1. The voltage setting unit 52 sets the voltage VF2 of the third mounting terminal M3 to the value corresponding to the voltage VF1 of the first mounting terminal M1. For example, the voltage setting unit 52 sets the voltage VF2 of the third mounting terminal M3 to a voltage having a constant difference from the voltage VF1 of the first mounting terminal M1. In the present embodiment, the voltage setting unit 52 sets the voltage VF2 of the third mounting terminal M3 identical to the voltage VF1 of the first mounting terminal M1. More specifically, the voltage setting unit 52 includes, for example, a voltage follower 520, and the voltage follower 520 includes an input terminal electrically connected to the first mounting terminal M1 and an output terminal electrically connected to the third mounting terminal M3. The detection circuit 53 is an A/D converter 530 that converts the voltage VF1 of the first mounting terminal M1 into a digital signal, the voltage VF1 being used as an anode voltage of the sensor element 160 when the current I1 from the constant current circuit 510 is supplied to the first mounting terminal M1. Additionally, the sensor drive circuit 50 includes a stabilizing capacitance 542 between a ground wire and an output line for the voltage VF1 of the anode of the sensor element 160, and a stabilizing capacitor 541 between the ground wire and an output line for the voltage follower 520.

Additionally, in the sensor drive circuit 50, the A/D converter 530 digitizes the voltage VF2 output from the voltage follower 520 to which the voltage VF1 of the anode of the sensor element 160 has been input, and outputs the resultant voltage to a central control unit 55. Accordingly, the voltage VF1 of the first mounting terminal M1 obtained when the current I1 output from the constant current circuit 510 is applied to the sensor element 160 has a negative correlation with the temperature of the electro-optical panel 100, and thus, when the voltage VF1 is detected by the detection circuit 53, the detection result is output to the central control unit 55 as a temperature signal corresponding to the temperature of the electro-optical panel 100.

During temperature detection, the same voltage is provided to both ends of the first resistive element R1, and thus the current I2 flowing through the first resistive element R1 is zero. Accordingly, the current I1 flowing from the first mounting terminal M1 becomes the current I4 flowing directly to the sensor element 160. Thus, the sensor element 160 can be appropriately driven, and the temperature of the electro-optical panel 100 can be accurately detected. Thus, in an electronic apparatus provided with the electro-optical device 1, the drive conditions and the like for the electro-optical device 1 can be adjusted under the control of the central control unit 55, thus allowing high display quality to be maintained. For example, under the control of the central control unit 55, the electronic apparatus can control cooling conditions for a cooling fan for the electro-optical panel 100, control heating conditions for a heater as a measure for a low-temperature environment, or correct image signals, thus allowing high display quality to be maintained.

In this regard, the slew rate of the operational amplifier constituting the voltage follower 520 has margins for changes in the forward voltage VF1 of the sensor element 160 involved in changes in the temperature of the electro-optical panel 100. Specifically, an increase in the temperature of the electro-optical panel 100 when a projection-type display device is turned on is approximately a few ° C./second, and thus there is no problem with the follow ability of the voltage followers 520. Accordingly, the voltage VF1 and the voltage VF2 are maintained at an equal value. In addition, even when the voltage VF1 and the voltage VF2 are offset from each other by a few mV due to the offset voltage of the operational amplifier, the offset is small, and the resistance value of the first resistive element R1 is 1 MΩ, which is large enough. Consequently, the current I2 is a micro-current. In addition, the sensor element 160 including a diode element has only a small change in the voltage VF1 in the forward direction with respect to a change in the current I1 (=I4).

First Modified Example of First Embodiment

Figure 4:
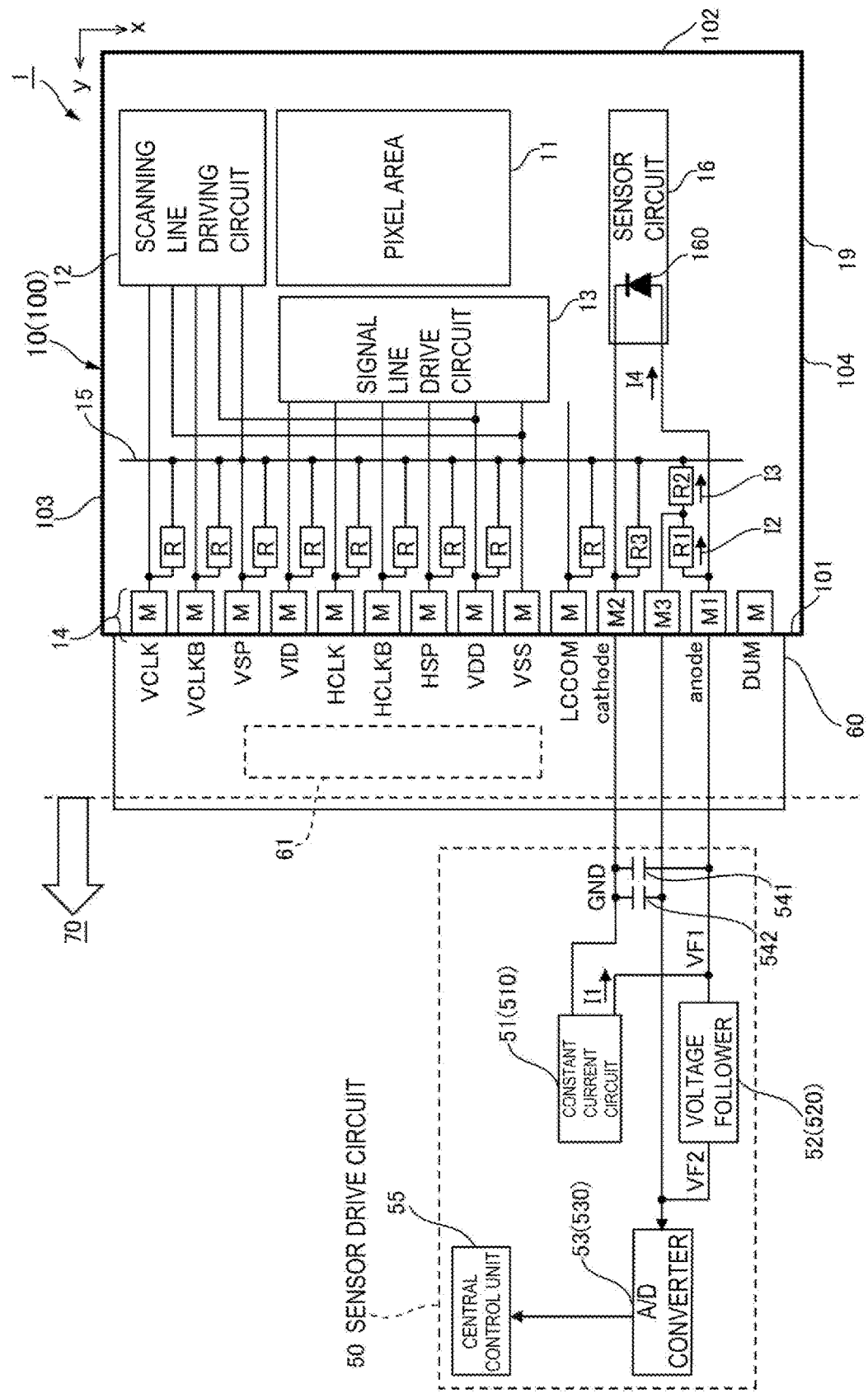
FIG. 4 is an explanatory diagram of an electro-optical device according to Modified Example 1 of the first embodiment of the present disclosure.

FIG. 4 is an explanatory diagram of the electro-optical device 1 according to Modified Example 1 of the first embodiment of the present disclosure. FIG. 4 illustrates how the temperature of the electro-optical panel 100 is detected in the form of the electro-optical device 1. Note that the basic configuration of the present embodiment is similar to the basic configuration of the first embodiment and thus that common portions are denoted by the same reference signs, with descriptions of the common portions omitted.

The first embodiment includes the sequential arrangement of the second mounting terminal M2 electrically connected to the cathode of the sensor element 160, the first mounting terminal M1 electrically connected to the anode of the sensor element 160, and the third mounting terminal M3 to which the same voltage VF2 as the voltage VF1 of the first mounting terminal M1 is applied. In the present embodiment, as illustrated in FIG. 4, the first mounting terminal M1, the third mounting terminal M3, and the second mounting terminal M2 are arranged in this order, and the third mounting terminal M3 is disposed between the first mounting terminal M1 and the second mounting terminal M2.

More specifically, when the first mounting terminal M1 and the second mounting terminal M2 are adjacent to each other, for example, when a high-resistance short circuit portion is present in the vicinity of the mounting terminal M of the first circuit board 60 or the first substrate 10, a portion of the current I1 that drives the sensor element 160 leaks to the node (GND) of the first mounting terminal M1, leading to an error in temperature detection. A high-resistance short circuit may be difficult to detect as a defect, and even when the detection leads to determination of acceptability, when the device is placed in a high humidity environment, the amount of leakage current components may increase due to corrosion of the wiring metal material, or the like.

In contrast, in the present embodiment, the third mounting terminal M3 is disposed between the first mounting terminal M1 and the second mounting terminal M2, the wire adjacent to the wire electrically connected to the anode of the sensor element 160 is the wire extending from the third mounting terminal M3. In this regard, the voltage VF1 of the first mounting terminal M1 and the voltage VF2 of the third mounting terminal M3 are in a relationship between the input voltage and the output voltage of the voltage follower 520, thus allowing substantial zeroing of the leakage current between the wire electrically connected to the anode of the sensor element 160 and the wire extending from the third mounting terminal M3. Thus, the constant current drive of the sensor element 160 can be properly maintained. Also, as illustrated in FIG. 4, the reliability of temperature detection can be improved by using the mounting terminal M adjacent to the first mounting terminal M1 on one side as the third mounting terminal M3 and using the mounting terminal M adjacent to the first mounting terminal M1 on the other side as the dummy DUM mounting terminal M, which is electrically floating. Additionally, the voltage VF2 may be supplied to the dummy DUM mounting terminal M as is the case with the third mounting terminal M3.

Modified Example 2 of First Embodiment

In the first embodiment, in the large substrate 90, the first resistive element R1, the second resistive element R2, and the like that are used to inspect the sensor elements 160 are all disposed in the plurality of first regions 91 into which the first substrates 10 are separated. Accordingly, the sensor element 160 may be inspected in the form of the first substrates 10 into which the large substrate 90 is divided. In this case, the first substrate 10 itself corresponds to the "substrate for an electro-optical device" according to the present disclosure.

Second Embodiment 2-1. Configuration of Large Substrate 90

Figure 5:
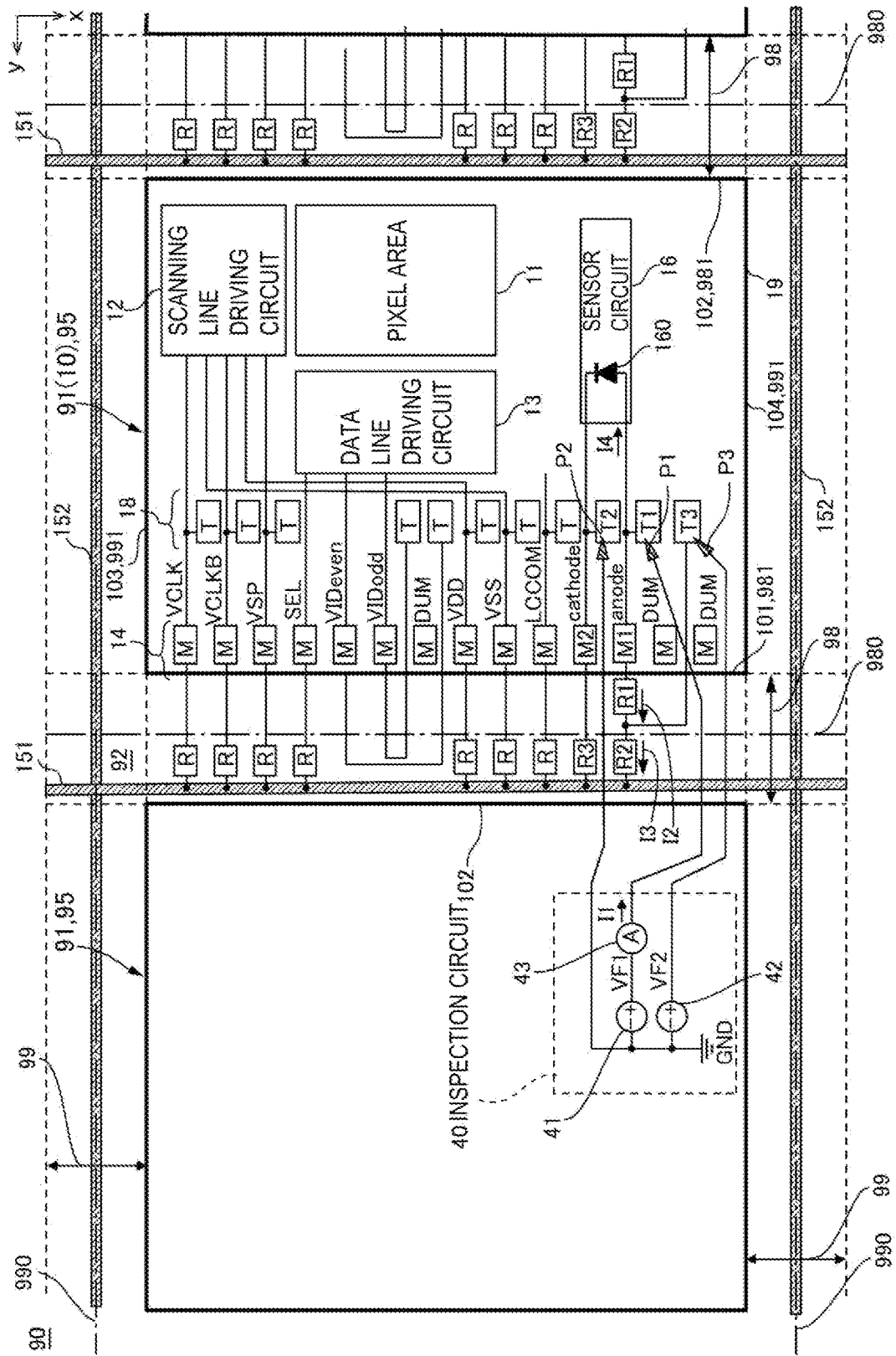
FIG. 5 is an explanatory diagram of a large substrate for manufacturing an electro-optical device according to a second embodiment of the present disclosure.

FIG. 5 is an explanatory diagram of the large substrate 90 for manufacturing the electro-optical device 1 according to the second embodiment of the present disclosure. FIG. 5 illustrates inspecting the sensor element 160 in the form of the large substrate 90 for manufacturing the first substrate 10. Note that the basic configuration of the present embodiment is similar to the basic configuration of the first embodiment and thus that common portions are denoted by the same reference signs, with descriptions of the common portions omitted.

In the present embodiment, the large substrate 90 includes a plurality of the first regions 91 in which the first substrate 10 is disposed, and a second region 92 located between the first regions 91 adjacent to each other, the second region 92 corresponding to a scribe region 98, 99 scribed when the first substrates 10 are separated into individual substrates. In the second embodiment, the first regions 91 of the large substrate 90 are separated into small substrates 95 as the first substrates 10, and the following are disposed in the second region 92 of the large substrate 90: the first resistive element R1, the second resistive element R2, the third resistive element R3, the first short circuit line 151, the resistive element R, and coupling lines coupling the portions together. In the present embodiment, the large substrate 90 corresponds to the "substrate for an electro-optical device" in the present disclosure.

As illustrated in FIG. 5, in the present embodiment, as in the first embodiment, the plurality of mounting terminals M are arranged in the mounting terminal region 14 of the first substrate 10, and the plurality of mounting terminals M and the wires extending from the plurality of mounting terminals M respectively correspond to the following signals and voltages. Note that in the present embodiment, in the optical device, a plurality of data lines extending in the display region of the substrate are blocked, and image signals supplied from the image signal wires provided corresponding to the respective blocks are distributed to the data lines by a demultiplexer. Thus, a plurality of the mounting terminals M corresponding to a selection signal SEL are provided, and a plurality of the mounting terminals M corresponding to the image signals VIDeven and VIDodd are provided. However, FIG. 5 illustrates only one mounting terminal M corresponding to the selection signal SEL and one mounting terminal M corresponding to each of the image signals VIDeven and VIDodd, with the remaining mounting terminals omitted. Note that the illustrated signal and power supply are representative examples and that in practice, an output control signal not illustrated shapes the waveform of the scanning signal output by the scanning line drive circuit 12.

- Clock signal VCLK for the scanning line drive circuit
- Inverted clock signal VCLKB for the clock signal VCLK
- Start pulse VSP for the scanning line drive circuit
- Selection signal SE
- Even-numbered sequence of the image signal VIDeven
- Odd-numbered sequence of the image signal VIDodd
- High voltage VDD
- Low voltage VSS
- Common voltage LCCOM The present embodiment uses more image signal terminals than the phase expansion driving method, leading to a reduced terminal width of the mounting terminal M in the mounting terminal region 14. Thus, bringing the test probe into contact with the mounting terminal M is difficult. Consequently, an inspection terminal region 18 is provided between the mounting terminal region 14 and the data line drive circuit 13 in parallel with the mounting terminal region 14, and the inspection terminal region 18 is provided with inspection terminals T in association with the mounting terminals M. Such inspection terminals T are used for inspection and the like of operation of the scanning line drive circuit, short circuiting between adjacent image signal lines, or continuity/decoupling of predetermined signal lines, and the like.

Additionally, the inspection terminal region 18 is provided with a first inspection terminal T1 electrically connected to the first mounting terminal M1, a second inspection terminal T2 electrically connected to the second mounting terminal M2, and a third inspection terminal T3. Thus, in the present embodiment, the first mounting terminal M1, the second mounting terminal M2, the third mounting terminal M3, the first inspection terminal T1, the second inspection terminal T2, and the third inspection terminal T3 constitute the "first terminal", the "second terminal", and the "third terminal" according to the present disclosure.

First terminal=first mounting terminal M1+first inspection terminal T1
Second terminal=second mounting terminal M2+second inspection terminal T2
Third terminal=third inspection terminal T3

Additionally, in the present embodiment, as in the first embodiment, the first substrate 10 is provided with the sensor circuit 16 including the sensor element 160 outside the pixel area 11. In the present embodiment, the sensor element 160 is a temperature detection element including a diode element.

2-2. Inspection of Sensor Element 160 in Form of Large Substrate 90

In the present embodiment, when the sensor elements 160 of the first substrate 10 is inspected, as illustrated in FIG. 5, the inspection is conducted in the form of the large substrate 90 including a plurality of the first regions 91 in which the respective first substrates 10 are disposed. In this regard, the scribe regions 98, 99 are present in the second regions 92 between adjacent first regions 91, and FIG. 5 illustrates scribe center lines 980 990 of the scribe regions 98, 99 as dash-dot-dash lines. When the large substrate 90 is divided into a plurality of the first substrates 10 as individual substrates, the second regions 92 are scraped, and the most of the second regions 92 are lost. In addition, the first regions 91 separated into the first substrates 10 are adjacent to the second regions 92 via the dividing lines 981, 991 used when the first regions 91 are separated into the small substrates 95 at the scribe regions 98 and 99.

In the present embodiment, the second region 92 is provided with a first short circuit line 151 extending in the x-axis direction along an end of the first substrate 10, and a second short circuit line 152 extending in the y-axis direction along an end of the first substrate 10, and the first region 91 is surrounded by the first short circuit line 151 and the second short circuit line 152. The first short circuit line 151 and the second short circuit line 152 are electrically connected to each other and constitute a guard ring surrounding the first region 91 obtained by division as the first substrate 10. The first short circuit line 151 and the second short circuit line 152 include, for example, a conductive layer such as a gate electrode film.

The mounting terminals M are electrically connected to the first short circuit line 151 via the respective resistive elements R provided in the scribe region 98. Thus, circuits electrically connected to the mounting terminals M can be protected from static electricity during the manufacturing process. However, the mounting terminals M corresponding to the image signals VIDeven, VIDodd are not electrically connected to the first short circuit line 151 via the respective resistive elements R because leakage current from these mounting terminals M disables the inspection. The image signals VIDeven, VIDodd are electrically connected to the inspection terminals T via wires provided in the scribe region 98. Accordingly, inspection can be easily conducted to check whether a short circuit is present in the wire extending into the first substrate 10 from the mounting terminal M for each of the image signals VIDeven and VIDodd.

Additionally, the scribe region 98 is provided with the first resistive element R1 electrically connected between the first mounting terminal M1 and the second mounting terminal M2, and the second resistive element R2 electrically connected between the first resistive element R1 and the second mounting terminal M2. Additionally, the first substrate 10 is provided with the third inspection terminal T3 located outside the pixel area 11 and electrically connected between the first resistive element R1 and the second resistive element R2. In the present embodiment, as in the first embodiment, one end of the first resistive element R1 is electrically connected to the first mounting terminal M1, and the other end is electrically connected to one end of the second resistive element R2. The other end of the second resistive element R2 is electrically connected to the first short circuit line 151. Accordingly, the first resistive element R1 and the second resistive element R2 are electrically connected in series between the first mounting terminal M1 and the first short circuit line 151, and the second resistive element R2 is electrically connected to the second mounting terminal M2 via the first short circuit line 151.

Additionally, the scribe region 98 is provided with a third resistive element R3 electrically connected at one end to the second mounting terminal M2, and the other end of the third resistive element R3 is electrically connected to the first short circuit line 151. Thus, the circuits electrically connected to the first mounting terminal M1 and the second mounting terminal M2 can be protected from static electricity during the manufacturing process. In this regard, the resistive element R, the first resistive element R1, the second resistive element R2, and the third resistive element R3 all have an equal resistance value. For example, the resistive elements R, the first resistive element R1, the second resistive element R2, and the third resistive element R3 all have a resistance value of 1 MΩ.

In the large substrate 90 configured as described above, as in the case of the first embodiment, the inspection circuit 40 is used to inspect the sensor element 160 in the first region 91 obtained by division as the first substrate 10. More specifically, the three probes of the inspection circuit 40 including the first probe P1, the second probe P2, and the third probe P3 are brought into contact with the first terminal, the second terminal, and the third terminal. Additionally, in this case, at the same time, the probes are brought into contact with the other inspection terminals T, and for example, a ground voltage GND voltage is applied to the other inspection terminals, though this is not illustrated in the drawings. Note that the inspection circuit 40 in FIG. 5 is a separate device not located on the large substrate 90 but located outside the large substrate 90.

In the present embodiment, as described below, of the first mounting terminal M1, the second mounting terminal M2, the first inspection terminal T1, the second inspection terminal T2, and the third inspection terminal T3, the first inspection terminal T1, the second inspection terminal T2, and the third inspection terminal T3 come into contact with the three probes of the inspection circuit 40 including the first probe P1, the second probe P2, and the third probe P3. Accordingly, the first inspection terminal T1, the second inspection terminal T2, and the third inspection terminal T3 constitute the "first terminal", the "second terminal", and the "third terminal" in the present disclosure.

First terminal=first inspection terminal T1
Second terminal=second inspection terminal T2
Third terminal=third inspection terminal T3

Accordingly, the power distribution circuit 41 applies the voltage VF1 to the first inspection terminal T1, with the cathode voltage of the sensor element 160 set to the ground voltage GND via the second probe P2 and the second inspection terminal T2, and the detection circuit 43 detects the current I1 flowing through the first inspection terminal T1. At this time, the voltage setting unit 42 maintains the following condition for the voltage VF2 applied to the third inspection terminal T3 via the third probe P3.

VF1=VF2

Thus, the voltage VF2 (=VF1) is applied to the coupling node between the first resistive element R1 and the second resistive element R2.

Consequently, the same voltage is provided to both ends of the first resistive element R1, and thus the current I2 flowing through the first resistive element R1 is zero. Thus, the current I1 flowing from the first mounting terminal M1 becomes the current I4 flowing directly to the sensor element 160. Accordingly, the electrical characteristics of the sensor element 160 can be accurately measured using the voltage VF1 and the current I1 of the first mounting terminal M1.

2-3. Temperature Detection during Driving of Electro-optical Device 1

Figure 6:
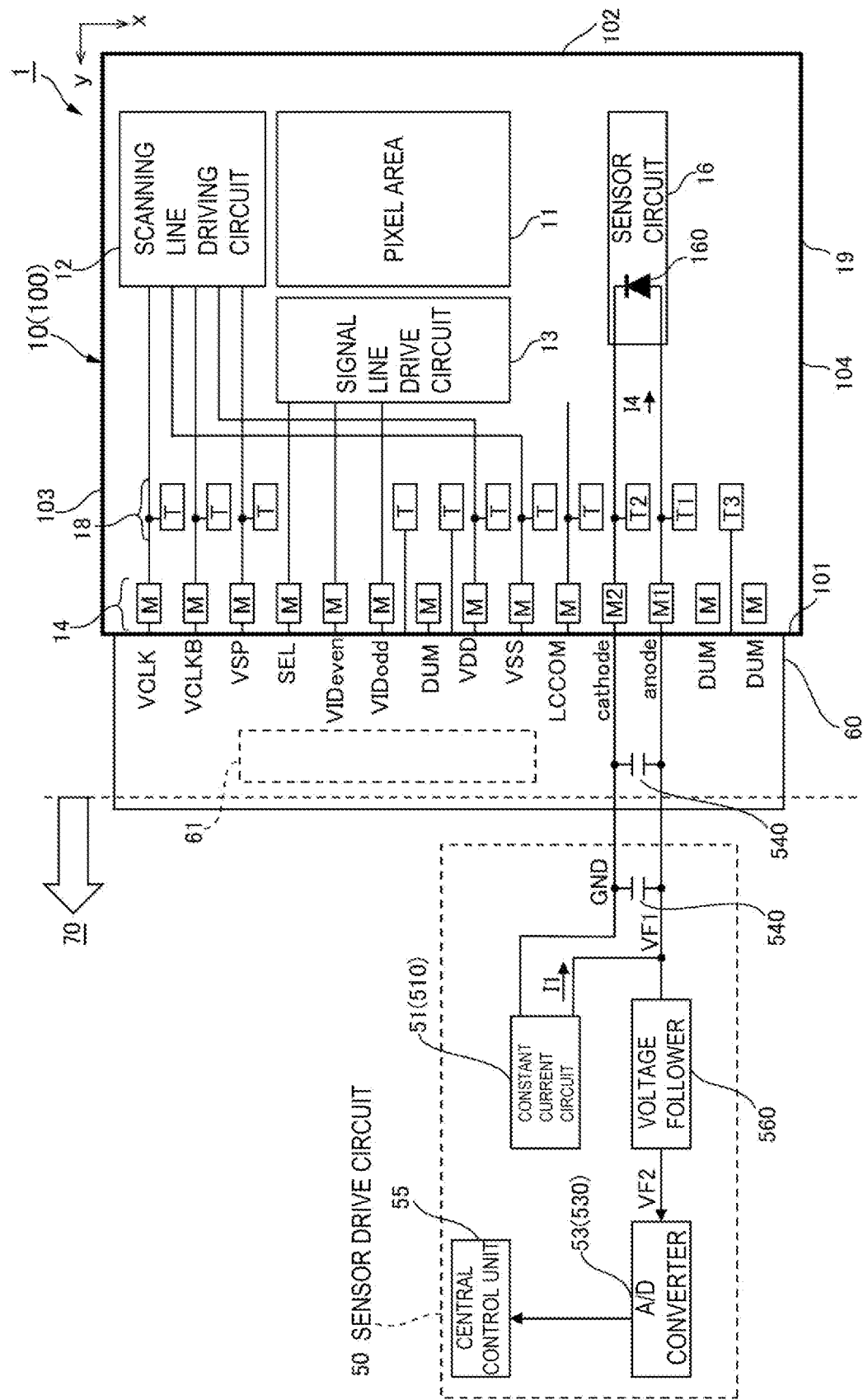
FIG. 6 is an explanatory diagram illustrating an electro-optical device according to the second embodiment of the present disclosure.

FIG. 6 is an explanatory diagram of the electro-optical device 1 according to the second embodiment of the present disclosure. In the inspection process described with reference to FIG. 5, the large substrate 90 in which the sensor element 160 is inspected in the form of a unitary substrate is divided into the first substrates 10 as the small substrates 95, and then the first substrate 10 is used for the electro-optical panel 100 of the electro-optical device 1 illustrated in FIG. 1. Accordingly, as illustrated in FIG. 6, in the form of the electro-optical device 1, the first substrate 10 typically lacks the first short circuit line 151, the second short circuit line 152, the resistive element R, the first resistive element R1, the second resistive element R2, and the third resistive element R3 because these components are destroyed by the scribe process. Some of these components may remain. Note that the third inspection terminal T3 remains in the first substrate 10, and the wire extending from the third inspection terminal T3 reaches the side 101 of the first substrate 10. Additionally, the first circuit board 60 is electrically connected to the mounting terminal M, the first mounting terminal M1, and the second mounting terminal M2. Consequently, during temperature detection, the first inspection terminal T1 and the second inspection terminal T2 constitute the "first terminal" and the "second terminal" in the present disclosure.

First terminal=first mounting terminal M1
Second terminal=second mounting terminal M2

Additionally, the sensor drive circuit 50 includes the power distribution circuit 51 that passes current through the first mounting terminal M1 with the voltage of the second mounting terminal M2 fixed, and the detection circuit 53 that detects the voltage of the first mounting terminal M1.

The power distribution circuit 51 is the constant current circuit 510 that sets the second mounting terminal M2 to the ground voltage GND, while supplying the first mounting terminal M1 with the current I1 made of a constant current. Additionally, the detection circuit 53 is the A/D converter 530, and converts, into a digital signal, the voltage VF2 output from the voltage follower 560 to which the voltage VF1 is input. The voltage VF1 is the anode voltage of the sensor element 160 obtained when the current I1 from the constant current circuit 510 is supplied to the first mounting terminal M1. Note that the sensor drive circuit 50 includes a stabilizing capacitor 540 between the wire extending from the power distribution circuit 51 to the second mounting terminal M2 and the wire extending from the voltage follower 560 to the first mounting terminal M1.

According to such a configuration, after the large substrate 90 is divided into the first substrates 10, the first substrate 10 lacks the first short circuit line 151, the second short circuit line 152, the resistive element R, the first resistive element R1, the second resistive element R2, and the third resistive element R3. Thus, the current I1 flowing from the first mounting terminal M1 becomes the current I4 flowing directly to the sensor element 160. Thus, the sensor element 160 can be properly driven. Accordingly, the voltage VF1 of the first mounting terminal M1 obtained when the current I1 is applied to the sensor element 160 has a negative correlation with the temperature of the electro-optical panel 100, and thus, when the voltage VF2 corresponding to the voltage VF1 is detected by the detection circuit 53, the detection result is output to the central control unit 55 as a temperature signal corresponding to the temperature of the electro-optical panel 100. Consequently, under the control of the central control unit 55, the electro-optical device 1 can control the cooling conditions for the cooling fan for the electro-optical panel 100, control the heating conditions for the heater as a measure for the low-temperature environment, or correct image signals. Note that in the present embodiment, both the first resistive element R1 and the second resistive element R2 are provided in the second region 72 but that the present embodiment is also applicable to a case where only one of the first resistive element R1 and the second resistive element R2 is provided in the second region 72. For example, the first resistive element R1 may be disposed between the first mounting terminal M1 and the dummy DUM mounting terminal M adjacent to the first mounting terminal M1. In this case, the first resistive element R1 remains on the first substrate 10.

Modified Example 1 of Second Embodiment

Figure 7:
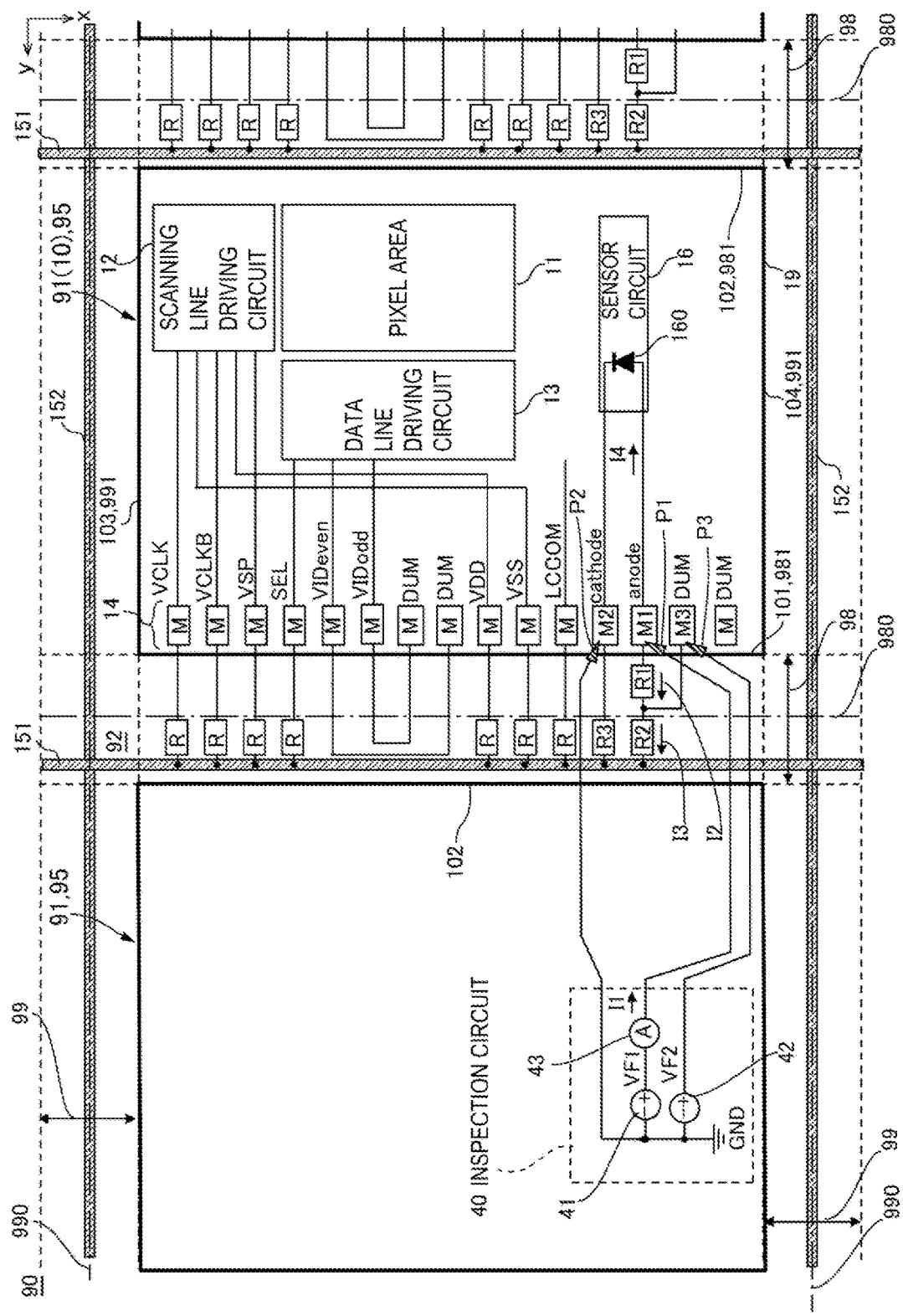
FIG. 7 is an explanatory diagram of Modified Example 1 of the second embodiment of the present disclosure.

FIG. 7 is an explanatory diagram of Modified Example 1 of the second embodiment of the present disclosure. FIG. 7 illustrates the large substrate 90 for manufacturing the first substrate 10. Note that the basic configuration of the present embodiment is similar to the basic configuration of the second embodiment and thus that common portions are denoted by the same reference signs, with descriptions of the common portions omitted. In the present embodiment, the large substrate 90 corresponds to the "substrate for an electro-optical device" in the present disclosure.

As illustrated in FIG. 7, in the present embodiment, as in the second embodiment, the plurality of mounting terminals M are arranged in the mounting terminal region 14 of the first substrate 10, and the plurality of mounting terminals M and the wires extending from the plurality of mounting terminals M respectively correspond to the following signals and voltages. Note that the illustrated signals and power supplies are representative examples as is the case with the second embodiment and that no such limitation is intended.

Clock signal VCLK for the scanning line drive circuit
Inverted clock signal VCLKB for the clock signal VCLK
Start pulse VSP for the scanning line drive circuit
Select Signal SEL
Even-numbered sequence of the image signal VIDeven
Odd-numbered sequence of the image signal VIDodd
High voltage VDD
Low voltage VSS
Common voltage LCCOM When the electro-optical panel 100 has a relatively large pixel pitch, the terminal width of the mounting terminals M can be increased, and thus the probes for inspection may be brought into contact with the mounting terminals M. In the present embodiment, the mounting terminals M are relatively large, and thus the inspection terminal T, the first inspection terminal T1, the second inspection terminal 12, and the third inspection terminal T3 illustrated in FIG. 5 are not provided. Thus, in the present embodiment, the first terminal M1, the second mounting terminal M2, and the third mounting terminal M3 constitute the "first terminal", the "second terminal", and the third terminal" in the present disclosure.

First terminal=first mounting terminal M1
Second terminal=second mounting terminal M2
Third terminal=third mounting terminal M3

Additionally, in the present embodiment, as in the second embodiment, the scribe regions 98 and 99 are provided with the first short circuit line 151, the second short circuit line 152, the first resistive element R1, the second resistive element R2, and the third resistive element R3. Accordingly, with the first mounting terminal M1, the second mounting terminal M2, and the third mounting terminal M3 respectively used as the first terminal, the second terminal, and the third terminal, the sensor element 160 can be properly inspected using the inspection circuit 40, as is the case with the second embodiment. In addition, in the form of the electro-optical device 1, the first substrate 10 typically lacks the first short circuit line 151, the second short circuit line 152, the resistive element R, the first resistive element R1, the second resistive element R2, and the third resistive element R3 because these components are destroyed by the scribe process. Additionally, the third mounting terminal M3 remains on the first substrate 10, and the wire extending from the third mounting terminal M3 reaches the side 101 of the first substrate 10. Accordingly, as is the case with the second embodiment, the temperature can be detected by the sensor drive circuit 50 respectively using the first mounting terminal M1 and the second mounting terminal M1 as the first terminal and the second terminal.

Modified Example 2 of Second Embodiment

Figure 8:
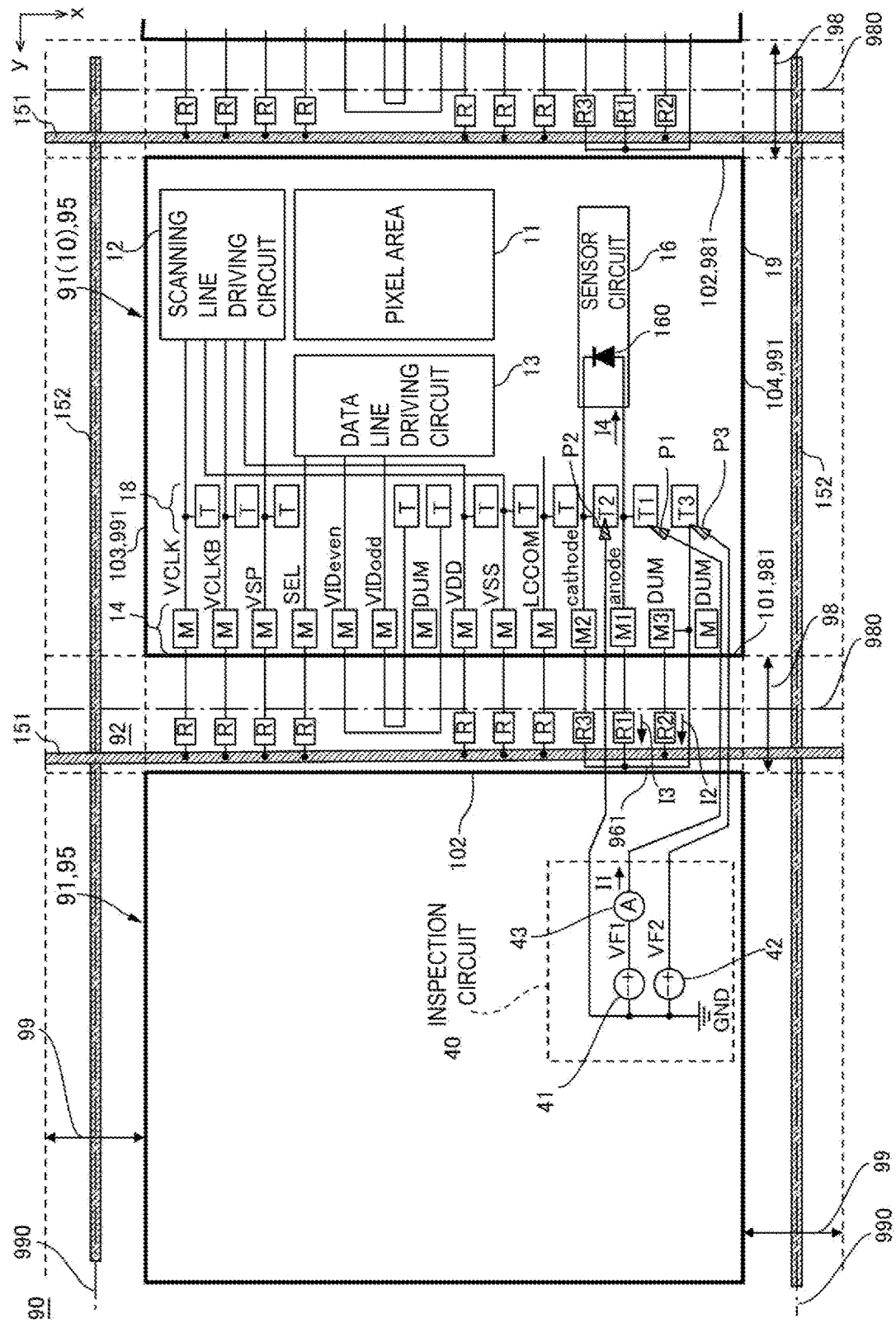
FIG. 8 is an explanatory diagram of Modified Example 2 of the second embodiment of the present disclosure.

FIG. 8 is an explanatory diagram of Modified Example 2 of the second embodiment of the present disclosure. FIG. 8 illustrates the large substrate 90 for manufacturing the first substrate 10. Note that the basic configuration of the present embodiment is similar to the basic configuration of the second embodiment and thus that common portions are denoted by the same reference signs, with descriptions of the common portions omitted. In the present embodiment, the large substrate 90 corresponds to the "substrate for an electro-optical device" in the present disclosure.

As illustrated in FIG. 8, in the present embodiment, as in the second embodiment, the plurality of mounting terminals M are arranged in the mounting terminal region 14 of the first substrate 10, and the plurality of mounting terminals M and the wires extending from the plurality of mounting terminals M respectively correspond to the following signals and voltages. Note that the illustrated signals and power supplies are representative examples as is the case with the second embodiment and that no such limitation is intended.

Clock signal VCLK for the scanning line drive circuit
Inverted clock signal VCLKB for the clock signal VCLK
Start pulse VSP for the scanning line drive circuit
Select Signal SEL
Even-numbered sequence of the image signal VIDeven
Odd-numbered sequence of the image signal VIDodd
High voltage VDD
Low voltage VSS
Common voltage LCCOM In the present embodiment, the inspection terminals T, the first inspection terminal T1, the second inspection terminal T2, and the third inspection terminal T3 are provided. Thus, in the present embodiment, the first mounting terminal M1, the second mounting terminal M2, the third mounting terminal M3, the first inspection terminal T1, the second inspection terminal T2, and the third inspection terminal T3 constitute the "first terminal", the "second terminal", and the "third terminal" according to the present disclosure.

First terminal=first mounting terminal M1+first inspection terminal T1

Second terminal=second mounting terminal M2+second inspection terminal T2

Third terminal=third mounting terminal M3+third inspection terminal T3

Additionally, in the present embodiment, as in the second embodiment, the scribe regions 98 and 99 are provided with the first short circuit line 151, the second short circuit line 152, the first resistive element R1, the second resistive element R2, and the third resistive element R3. Accordingly, the three first probe P1, the second probe P2, and the third probe P3 are brought into contact with the first inspection terminal T1, the second inspection terminal T2, and the third inspection terminal T3, and the sensor element 160 can be properly inspected by the inspection circuit 40.

In this regard, the third resistive element R3 electrically connected to the second mounting terminal M2 and the second inspection terminal T2 is not directly electrically connected to the first short circuit line 151, and is connected to a wiring portion 961 in the scribe region 98. Additionally, the first resistive element R1 is not directly connected to the second resistive element R2, and is connected to the wiring portion 961 in the scribe region 98. Furthermore, the wiring portion 961 is electrically connected to the first short circuit line 151 via the third mounting terminal M3 and the second resistive element R2. The third inspection terminal T3 is electrically connected to the third mounting terminal M3. Note that in FIG. 8, the third inspection terminal T3 and the third mounting terminal M3 are electrically connected within the first substrate 10, but may also be electrically connected in the scribe region 98. In FIG. 8, the third inspection terminal T3 and the third mounting terminal M3 are electrically connected at a long side of a rectangular terminal electrode of the third mounting terminal M3, but may be electrically connected at an inner short side of the first substrate 10.

In the arrangement as described above, the first resistive element R1, the second resistive element R2, and the third resistive element R3 are aligned in the arrangement direction (x-axis direction) of the mounting terminals M, facilitating alignment of resistive elements having the same layout as that of other resistive elements R and the like. In the second embodiment illustrated in FIG. 5, since the first resistive element R1 and the second resistive element R2 are aligned in the y-axis direction, it is necessary to have a layout different from the other resistive elements R and the like, and the number of manufacturing operations of the resistive elements increases. In addition, depending on variation in the scribe process, after division into the first substrates 10, the first mounting terminal M1 and the third inspection terminal T3 may remain electrically connected via the first resistive element R1. This increases the number of electrostatic intrusion routes to the sensor circuit 16. This is not preferable.

Additionally, the first mounting terminal M1 and the second mounting terminal M2 electrically connected to the sensor circuit 16 are electrically connected by the first resistive element R1, the wiring portion 961 in the scribe region 98, and the third resistive element R3, and the wiring portion 961 is further electrically connected to the first short circuit line 151 via the third mounting terminal M3 and the second resistive element R2. This allows production of the effect of protecting the sensor circuit 16 from electrostatic discharge damage during the manufacturing process. Additionally, in the present embodiment, the second resistive element R2 has a sufficiently large resistance value, causing the voltage VF2 (=VF1) to be applied to the coupling node between the first resistive element R1 and the second resistive element R2.

In addition, in the form of the electro-optical device 1, the first substrate 10 typically lacks the first short circuit line 151, the second short circuit line 152, the resistive element R, the first resistive element R1, the second resistive element R2, and the third resistive element R3 because these components are destroyed by the scribe process. Additionally, the third mounting terminal M3 remains on the first substrate 10, and the wire extending from the third mounting terminal M3 reaches the side 101 of the first substrate 10 via the dummy mounting terminal M. Accordingly, as is the case with the second embodiment, the temperature can be detected by the sensor drive circuit 50 respectively using the first mounting terminal M1 and the second mounting terminal M1 as the first terminal and the second terminal.

Modified Example 3 of Third Embodiment

Figure 9:
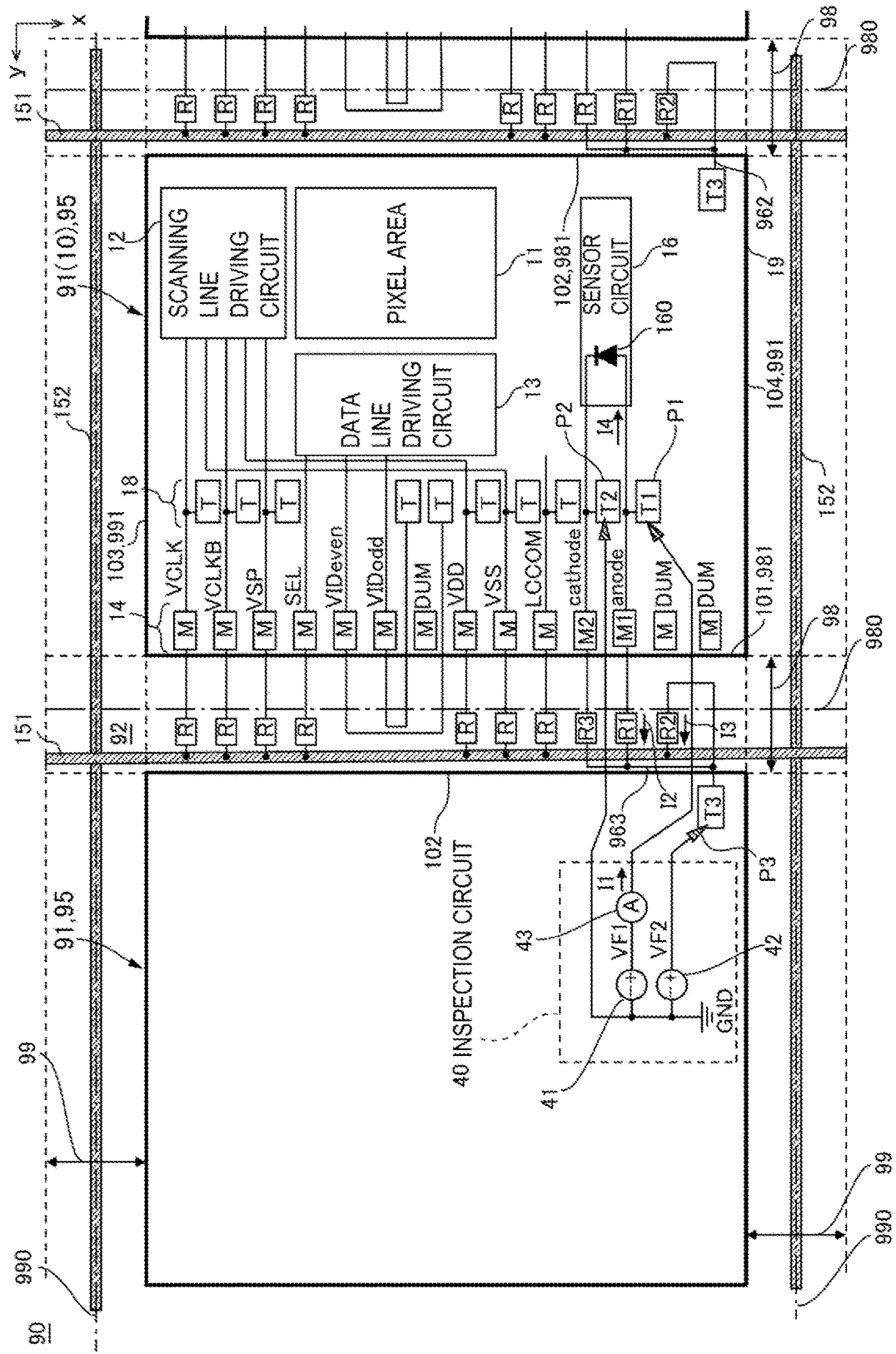
FIG. 9 is an explanatory diagram of Modified Example 3 of the second embodiment of the present disclosure.

FIG. 9 is an explanatory diagram of Modified Example 3 of the second embodiment of the present disclosure. FIG. 8 illustrates the large substrate 90 for manufacturing the first substrate 10. Note that the basic configuration of the present embodiment is similar to the basic configuration of Modified Example 3 of the second embodiment and thus that common portions are denoted by the same reference signs, with descriptions of the common portions omitted. In the present embodiment, the large substrate 90 corresponds to the "substrate for an electro-optical device" in the present disclosure.

As illustrated in FIG. 9, in addition to the plurality of mounting terminals M, the inspection terminals T, the first inspection terminals T1, the second inspection terminals T2, and the third inspection terminals T3 are provided. Thus, in the present embodiment, the first terminal M1, the second mounting terminal M2, the first inspection terminal T1, the second inspection terminal T2, and the third inspection terminal T3 constitute the "first terminal", the "second terminal", and the third terminal "according to the present disclosure.

First terminal=first mounting terminal M1+first inspection terminal T1

Second terminal=second mounting terminal M2+second inspection terminal T2

Third terminal=third inspection terminal T3

In this regard, in the large substrate 90, the third inspection terminal T3 is in the adjacent first region 91 in the y-axis direction. In other words, when the first substrate 10 is viewed, on the side 102 side of the first substrate 10, the third inspection terminal T3 corresponding to the adjacent first region 91 is present, and a wiring portion 962 extending from the third inspection terminal T3 toward the side 102 of the first substrate 10 is present.

This configuration increases the degree of freedom of arrangement of the third inspection terminal T3. For example, a situation can be avoided in which, when an attempt is made to dispose the third inspection terminal T3 near the other inspection terminals T, the first inspection terminal T1, and the second inspection terminal T2, the wiring width of various signal lines and power supply wires on the first substrate 10 is reduced, leading to a drive problem to degrade display quality.

Additionally, the first mounting terminal M1 and the second mounting terminal M2 electrically connected to the sensor circuit 16 are electrically connected by the first resistive element R1, a wiring portion 963 in the scribe region 98, and the third resistive element R3, and the wiring portion 963 is further electrically connected to the first short circuit line 151 via the second resistive element R2. This produces the effect of protecting the sensor circuit 16 from electrostatic discharge damage during the manufacturing process. With the first inspection terminal T1, the second inspection terminal T2, and the third inspection terminal T3 respectively used as the first terminal, the second terminal, and the third terminal, the sensor element 160 can be properly inspected using the inspection circuit 40, as is the case with the second embodiment.

In addition, in the form of the electro-optical device 1, the first substrate 10 typically lacks the first short circuit line 151, the second short circuit line 152, the resistive element R, the first resistive element R1, the second resistive element R2, and the third resistive element R3 because these components are destroyed by the scribe process. Additionally, the third inspection terminal T3 corresponding to the adjacent first region 91 remains on the first substrate 10, and the wiring portion 962 extending from the third inspection terminal T3 reaches the side 102 of the first substrate 10. Consequently, as is the case with the second embodiment, no unintended short circuit path is present between the first mounting terminal M1 and the second mounting terminal M2, other than the sensor circuit 16. Accordingly, as is the case with the second embodiment, the temperature can be detected by the sensor drive circuit 50 respectively using the first mounting terminal M1 and the second mounting terminal M1 as the first terminal and the second terminal.

Other Embodiments

In the above-described embodiments, at least a portion of the circuit such as the constant current circuit 510 and the voltage follower 520 illustrated in FIG. 3 may be provided on the first circuit board 60. For example, in the second embodiment illustrated in FIG. 6, a portion of the stabilizing capacitor 540 may be provided on the first circuit board 60. The stabilizing capacitor 540 is, for example, from 0.1 μF to 1 μF. The sensor circuit 16 includes an electrostatic discharge protection circuit, but it is difficult to provide a robust protection circuit in order to suppress leakage current associated with an increase in the temperature of the electro-optical panel 100. In this regard, when a portion of the stabilizing capacitor 540 is provided on the first circuit board 60, this configuration allows enhancement of the protection of the sensor circuit 16 against static electricity intruding from the coupling terminal on the second circuit board 70 side of the first circuit board 60.

In the first embodiment described above, the voltage setting unit 52 makes the voltage VF2 identical to the voltage VF1 of the first mounting terminal M1, but the voltage VF2 may be different from the voltage VF1 of the first mounting terminal M1 as long as the voltage VF2 corresponds to the voltage VF1. In other words, the current I2 flowing through the first resistive element R1 is (VF1− VF2)/R1, and thus, a constant difference between the voltage VF1 and the voltage VF2 enables constant current driving with (current I1-current I2). In this case, the voltage setting unit 52 includes a summation circuit, subtraction circuit, or the like using a stable reference voltage, instead of the voltage follower 520.

In the embodiment described above, the diode may be a diode connected transistor. Additionally, in the above embodiment, the sensor element 160 is for temperature detection, but the sensor element 160 may be for light detection. For example, by using the sensor element 160 to detect the illumination of the environment, drive conditions for the electro-optical device 1, the illumination of a lighting device of the electronic apparatus, and the like may be controlled according to the illumination of the environment.

In that case, for example, in FIG. 2, the cathode of the diode element (sensor element 160) is electrically connected to the first mounting terminal M1, the anode of the diode element is electrically connected to the second mounting terminal M2, and the reverse bias current of the diode element is detected on the cathode side. The detection circuit 43 is an ammeter. When a short circuit path by the resistive element is present between the anode and cathode of the diode element, the electrical properties fail to be properly measured. However, in the configuration according to the present disclosure, the voltage VF2 that is the same as the voltage VF1 applied to the first mounting terminal M1 is applied to the third mounting terminal M3. Accordingly, the current I2 flowing through the first resistive element R1 can be ignored. In other words, the electrical properties of the diode element can be appropriately measured.

Other configurations are also possible. For example, in FIG. 2, in FIG. 2, the anode of the diode element (sensor element 160) is electrically connected to the first mounting terminal M1, the cathode of the diode element is electrically connected to the second mounting terminal M2, and the reverse bias current of the diode element is detected on the anode side. Instead of the ground voltage GND, an independent positive voltage is applied to the second mounting terminal M2. The inspection circuit 40 detects the current I1 as a sink current using the ammeter of the detection circuit 43. In this case as well, the voltage VF2 that is the same as the voltage VF1 applied to the first mounting terminal M1 is applied to the third mounting terminal M3. Accordingly, the current I2 flowing through the first resistive element R1 can be ignored. In other words, the electrical properties of the diode element can be appropriately measured.

In the above embodiment, the inspection circuit 40 inspects the sensor element 160 by using the detection circuit 43 to detect the current I1 obtained when the power distribution circuit 41 applies the voltage VF1 made of a constant voltage. However, the inspection circuit may inspect the sensor element 160 by using the detection circuit 43 to detect voltage VF1 obtained when the power distribution circuit 41 passes the current I1 made of a constant current. Of course, the output voltage or output current from the power distribution circuit 41 may be swept for measurement. In the above embodiment, the sensor drive circuit 50 detects the temperature of the electro-optical panel 100 by using the detection circuit 53, to detect the voltage VF1 obtained when the power distribution circuit 51 applies the current I1 made of a constant current. However, the sensor drive circuit 50 may detect the temperature or the like by using the detection circuit 53, to detect the current I1 obtained when the power distribution circuit 51 applies the voltage VF1 made of a constant voltage.

In the above-described embodiments, the electro-optical device 1 is a transmissive liquid crystal device. However, the disclosure may be applied to a case in which the electro-optical device 1 is a reflection-type liquid crystal device or a display device such as an organic electroluminescence device using a light emitting element. Additionally, for the pixels, display elements (MEMS devices) such as Digital Micromirror Devices (DMDs) may be adopted.

Configuration Example of Electronic Apparatus

Figure 10:
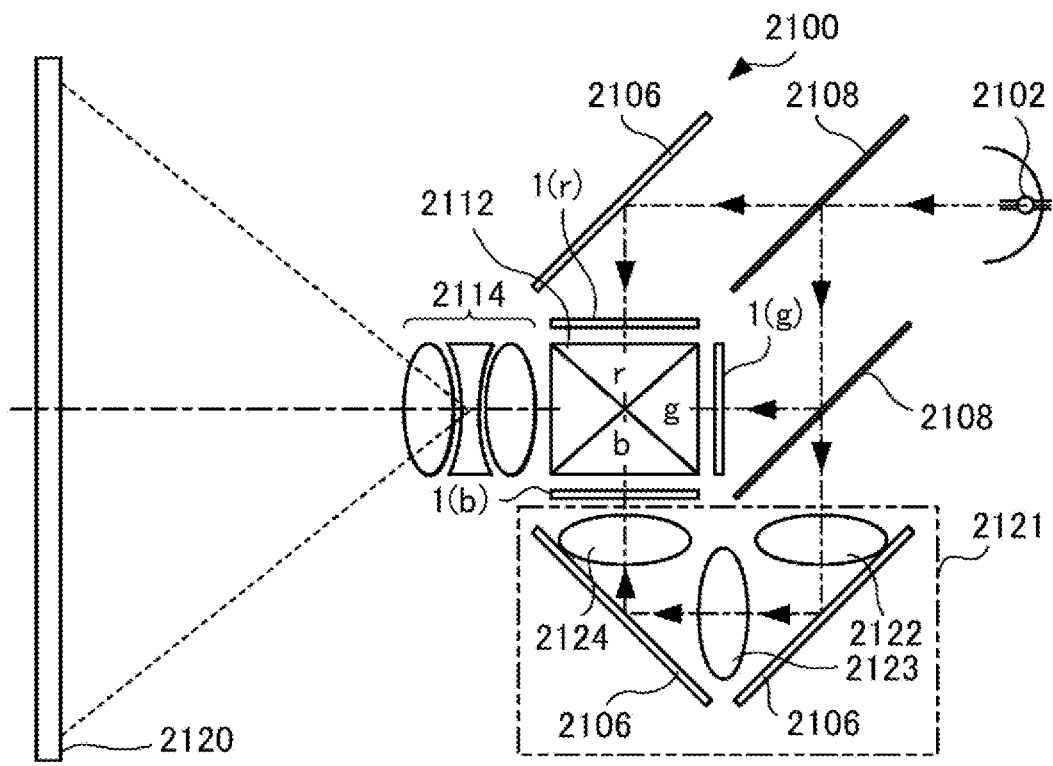
FIG. 10 is a schematic configuration diagram illustrating an electronic apparatus to which the present disclosure is applied.

FIG. 10 is a schematic configuration diagram of an electronic apparatus 2100 to which the disclosure is applied. As an example of an electronic apparatus 2100 to which the present disclosure is applied, FIG. 10 illustrates a projection-type display device including the electro-optical device 1 to which the present disclosure is applied. Note that FIG. 10 omits an optical element such as a polarizing plate disposed on an incident side or an exit side of the electro-optical device 1.

In FIG. 10, the electronic apparatus 2100 is a projection-type display device provided with, as a light source unit, a lamp unit 2102 with a white light source such as a halogen lamp. Projection light exiting the lamp unit 2102 is separated into three primary colors of R (red), G (green), and B (blue) by three mirrors 2106 and two dichroic mirrors 2108 installed inside. Beams of light obtained by the separation are respectively guided to electro-optical devices 1(r), 1(g), and 1(b) corresponding to the respective colors. The electro-optical devices 1(r), 1(g), and 1(b) are transmissive liquid crystal devices. Note that the light of blue b has a longer optical path than the other colors of red r and green g and thus that to prevent a loss due to the longer optical path, the light of blue b is guided via a relay lens system 2121 including an incidence lens 2122, a relay lens 2123, and an exit lens 2124.

In the electronic apparatus 2100, image signals specifying the gray scale levels of the colors are supplied from an external upper circuit to the electronic apparatus 2100, and then processed by a processing circuit of the electronic apparatus 2100 and supplied to the electro-optical devices 1(r), 1(g), and 1(b). Then, the electro-optical devices 1(r), 1(g), and 1(b) modulate the incident light based the image signals. The modulated beams of light exiting the electro-optical devices 1(r), 1(g), and 1(b) are incident on the dichroic prism 2112 from three directions. Then, at the dichroic prism 2112, the light of red r and the light of blue b are reflected at 90 degrees, and the light of green g is transmitted. Thus, after the modulated beams of light of the respective colors are synthesized by the dichroic prism 2112, a projection optical system 2114 projects the resultant light on a projection member such as a screen 2120, as a color image. Note that the projection-type display device may use an LED light source or the like from which beams of light of the respective colors exit and respectively supply the electro-optical devices 1(r), 1(g), and 1(b) with the beams of color light exiting the LED light source or the like.

In response to detecting the temperature of the electro-optical panel 100, the electronic apparatus 2100 configured as described above can switch the drive conditions for the electro-optical device 1 under the control of the central control unit 55 illustrated in FIG. 3 and the like, and can thus maintain high display quality. For example, under the control of the central control unit 55, the electronic apparatus 2100 can properly control the cooling fan for the electro-optical panel 100, control the heater as a measure for the low-temperature environment, or correct video signals, and can thus maintain high display quality.

Other Electronic Apparatuses

The electronic apparatus including the electro-optical device 1 to which the present disclosure is applied is not limited to the electronic apparatus 2100 of the above-described embodiments. Examples of the electronic apparatus may include a projection-type head up display (HUD), a direct-view-type head mounted display (HMD), a personal computer, a digital still camera, and a liquid crystal television.

What is claimed is:

1. An electro-optical device comprising:
a small substrate corresponding to a first region obtained by dividing a substrate for an electro-optical device;
a circuit board electrically connected to the small substrate; and
a sensor drive circuit provided at the circuit board, wherein
the substrate comprises:
a sensor element;
a first terminal electrically connected to a first electrode of the sensor element;
a second terminal electrically connected to a second electrode of the sensor element;
a first resistive element including a first end electrically connected to the first terminal and a second end electrically connected to the second terminal;
a second resistive element including a first end electrically connected to the first resistive element and a second end electrically connected to the second terminal; and
a third terminal electrically connected to the second end of the first resistive element and the first end of connected the second resistive element,
the first region includes a pixel area in which pixel electrodes are arranged and a mounting terminal electrically connected to the pixel area,
the sensor element, the first terminal, the second terminal, the third terminal, the first resistive element, and the second resistive element are provided in the first region, and
the sensor drive circuit includes a power distribution circuit configured to pass current through the first terminal, a detection circuit configured to detect a voltage or current of the first terminal, and a voltage setting unit configured to apply, to the third terminal, a voltage corresponding to the voltage of the first terminal.

2. The electro-optical device according to claim 1, wherein
the sensor element is a temperature sensor including a diode element.

3. The electro-optical device according to claim 1, including:
a short circuit line; and
a third resistive element including a first end electrically connected to the second terminal and a second end electrically connected to the short circuit line, wherein
the second end of the second resistive element opposite to the first end of the second resistive element electrically connected to the first resistive element is electrically connected to the short circuit line.

4. The electro-optical device according to claim 1, wherein
the third terminal is disposed between the first terminal and the second terminal.

5. The electro-optical device according to claim 1, including:
a first region including a pixel area in which pixel electrodes are arranged and a mounting terminal electrically connected to the pixel area; and
a second region adjacent to the first region, wherein
at least the sensor element, the first terminal, and the second terminal are provided in the first region, and
at least one of the first resistive element and the second resistive element is provided in the second region.

6. The electro-optical device according to claim 5, comprising:
a small substrate corresponding to the first region obtained by dividing the substrate;
a circuit board electrically connected to the small substrate; and a sensor drive circuit provided at the circuit board, wherein the sensor drive circuit includes a power distribution circuit configured to pass current through the first terminal, and a detection circuit configured to detect a voltage or current of the first terminal.

7. The electro-optical device according to claim 1, wherein the power distribution circuit is a constant current circuit, and the detection circuit detects the voltage of the first terminal.

8. The electro-optical device according to claim 1, wherein the voltage setting unit applies, to the third terminal, a voltage identical to the voltage of the first terminal.

9. The electro-optical apparatus according to claim 8, wherein the voltage setting unit is a voltage follower, the first terminal is electrically connected to an input terminal of the voltage follower, and an output terminal of the voltage follower is electrically connected to the third terminal.

10. An electronic apparatus comprising the electro-optical device according to claim 1, wherein a drive condition, a cooling condition, and a heating condition for the electro-optical device are adjusted based on an output from the detection circuit.

11. A method for manufacturing the electro-optical device according to claim 1, wherein the electro-optical device is manufactured using a small substrate corresponding to the first region obtained by dividing the substrate.

12. An inspection circuit for inspecting a sensor element of a substrate for an electro-optical device, the substrate comprising:

the sensor element;

a first terminal electrically connected to a first electrode of the sensor element;

a second terminal electrically connected to a second electrode of the sensor element;

a first resistive element including a first end electrically connected to the first terminal and a second end electrically connected to the second terminal;

a second resistive element including a first end electrically connected to the first resistive element and a second end electrically connected to the second terminal; and a third terminal electrically connected to the second end of the first resistive element and the first end of connected the second resistive element, the inspection circuit comprising:

a power distribution circuit configured to pass current through the first terminal;

a voltage setting unit configured to apply, to the third terminal, a voltage corresponding to a voltage of the first terminal; and a detection circuit configured to detect a voltage or current of the first terminal.

13. The inspection circuit according to claim 12, wherein the voltage setting unit applies, to the third terminal, a voltage identical to the voltage of the first terminal.

14. The inspection circuit according to claim 13, wherein the voltage setting unit is a voltage follower, the first terminal is electrically connected to an input terminal of the voltage follower, and an output terminal of the voltage follower is electrically connected to the third terminal.

* * * * *